United States Patent
Kaneko et al.

(10) Patent No.: US 9,639,223 B2
(45) Date of Patent: May 2, 2017

(54) DISPLAY DEVICE WITH TOUCH DETECTION FUNCTION AND ELECTRONIC APPARATUS

(71) Applicant: Japan Display Inc., Tokyo (JP)

(72) Inventors: Hideki Kaneko, Tokyo (JP); Yoshihide Oue, Tokyo (JP)

(73) Assignee: Japan Display Inc., Tokyo (JP)

( * ) Notice: Subject to any disclaimer, the term of this patent is extended or adjusted under 35 U.S.C. 154(b) by 1 day.

(21) Appl. No.: 14/712,216

(22) Filed: May 14, 2015

(65) Prior Publication Data

US 2015/0331518 A1 Nov. 19, 2015

(30) Foreign Application Priority Data

May 16, 2014 (JP) ................................. 2014-102868
May 8, 2015 (JP) ................................. 2015-095421

(51) Int. Cl.
*G06F 3/044* (2006.01)
*G09G 3/36* (2006.01)
*G06F 3/041* (2006.01)

(52) U.S. Cl.
CPC ............ *G06F 3/044* (2013.01); *G06F 3/0412* (2013.01); *G09G 3/3607* (2013.01); *G09G 3/3648* (2013.01); *G09G 3/3655* (2013.01); *G09G 2300/0408* (2013.01); *G09G 2310/08* (2013.01)

(58) Field of Classification Search
CPC .................. G06F 3/044; G06F 3/0412; G06F 2203/04111; G06F 2203/04112; G06F 3/0416; G06F 1/16; G06F 2203/04103; G06F 2203/04107; G06F 3/041; G06F 3/042; G06F 3/046; G06F 3/047; G06F 3/0418
See application file for complete search history.

(56) References Cited

U.S. PATENT DOCUMENTS

| | | | |
|---|---|---|---|
| 2009/0051638 A1* | 2/2009 | Horiuchi | G09G 3/2003 345/88 |
| 2010/0156947 A1* | 6/2010 | Moon | G09G 3/3648 345/690 |
| 2010/0328291 A1 | 12/2010 | Ishizaki et al. | |
| 2015/0219971 A1* | 8/2015 | Tanaka | G02F 1/13338 349/12 |

FOREIGN PATENT DOCUMENTS

| | | |
|---|---|---|
| JP | 2012-022148 | 2/2012 |
| JP | 5439060 | 12/2013 |

* cited by examiner

*Primary Examiner* — Gerald Johnson
(74) *Attorney, Agent, or Firm* — K&L Gates LLP

(57) ABSTRACT

According to an aspect, a display device with a touch detection function includes a display area; a pixel electrode; a plurality of scan lines; a plurality of data lines; an auxiliary wiring that is a wiring of a metal material having an electrical resistance lower than that of a material of the drive electrodes, is arranged so as to extend in the row direction for each row of the pixels, and is electrically coupled to the drive electrode; a control device that performs image display control and touch detection control; a touch detection electrode that faces the drive electrodes and forms a capacitance with the drive electrodes; and a touch detection unit that detects a position of a proximity object based on a detection signal sent from the touch detection electrode.

6 Claims, 18 Drawing Sheets

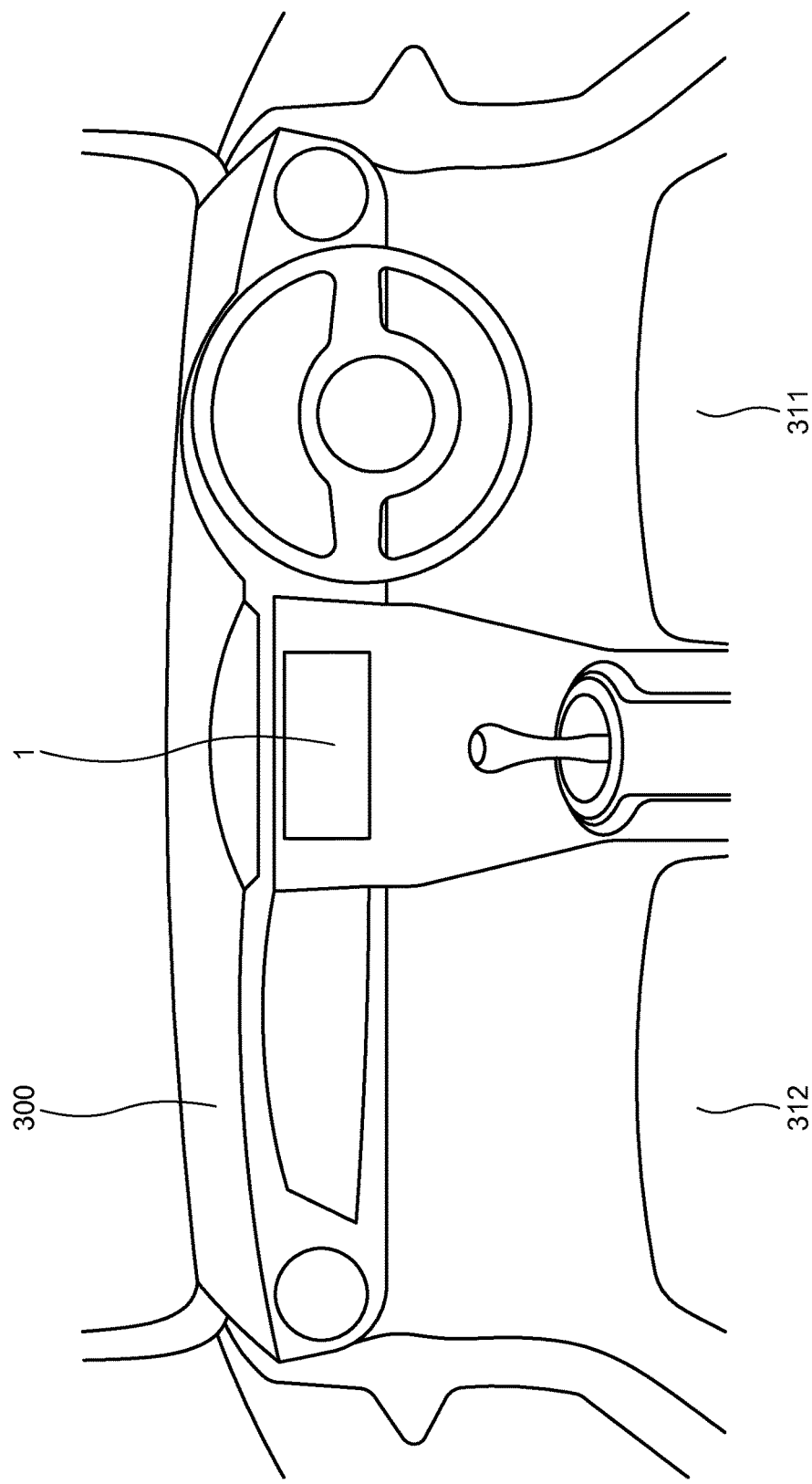

DISPLAY DEVICE WITH TOUCH DETECTION FUNCTION AND ELECTRONIC APPARATUS

CROSS REFERENCES TO RELATED APPLICATIONS

The present application claims priority to Japanese Priority Patent Application JP 2014-102868 filed in the Japan Patent Office on May 16, 2014, and JP 2015-095421 filed in the Japan Patent Office on May 8, 2015, the entire content of which is hereby incorporated by reference.

BACKGROUND

1. Technical Field

The present invention relates to a display device capable of detecting an external proximity object, and more particularly, to a display device with a touch detection function capable of detecting an external proximity object approaching from the outside based on a change in a capacitance and to an electronic apparatus.

2. Description of the Related Art

Recently, a touch detection device, which is referred to as a so-called touch panel, capable of detecting an external proximity object has been attracting attention. The touch panel is used for a display device with a touch detection function which is mounted on or integrated into the display device such as a liquid-crystal display device. The display device with a touch detection function displays various button images and the like on the display device, and this allows input of information using the touch panel instead of normal mechanical buttons. The display device with a touch detection function having such a touch panel does not require an input device such as a keyboard, a mouse, or a keypad. Therefore, in addition to computers, the use thereof tends to increase also in portable information terminals such as mobile phones.

Examples of the touch detection device include an optical-type touch detection device, a resistive-type touch detection device, and a capacitive-type touch detection device. The capacitive-type touch detection device used for a mobile terminal or so has a comparatively simple structure and is capable of achieving low power consumption. For example, Japanese Patent No. 5439060 (JP-5439060) describes a capacitive touch panel.

Japanese Patent Application Laid-open Publication No. 2012-22148 (JP-A-2012-22148) describes pixels in each of which sub-pixels representing the same color are arrayed in a direction along a scan line.

When the display device with a touch detection function described in JP-5439060 is to be applied to the display device described in JP-A-2012-22148, resistance of a drive electrode that supplies a drive signal affects a time constant of a waveform of the drive signal, and this may therefore exert an influence on the accuracy of touch detection. For this reason, an auxiliary wiring having a low resistance may be added in order to reduce a connection resistance. However, because the auxiliary wiring of a metal material is less translucent than a material of the drive electrode, an aperture ratio may become less due to the restriction of the array of the sub-pixels described in JP-A-2012-22148.

For the foregoing reasons, there is a need for a display device with a touch detection function and an electronic apparatus that can reduce an influence on an aperture ratio and improve accuracy of touch detection.

For the foregoing reasons, there is a need for a display device with a touch detection function and an electronic apparatus that can reduce a connection resistance of a selection switch for selecting a drive electrode to be supplied with a drive signal, and can narrow a frame.

SUMMARY

According to an aspect, a display device with a touch detection function includes a display area that has a plurality of pixels arranged in a matrix including a plurality of rows and a plurality of columns, in which one of the pixels includes a plurality of sub-pixels that represent mutually different colors and are arrayed in one column with k rows (k is a natural number of 3 or more), and in which arbitrary sub-pixels representing same color among arbitrary pixels that are adjacent to each other in a row direction are arrayed along the row direction; a display function layer that has an image display function for displaying an image in the display area; a pixel electrode that is provided in each of the sub-pixels and supplies an applied voltage to the display function layer by a potential difference with a common potential which is a reference; a plurality of scan lines that extend in the row direction of the display area and scan switching elements of the sub-pixels; a plurality of data lines that extend in a column direction of the display area and supply an applied voltage to the pixel electrodes; a plurality of drive electrodes that are provided facing the pixel electrodes and extend in the row direction; an auxiliary wiring that is a wiring of a metal material having an electrical resistance lower than that of a material of the drive electrodes, is arranged so as to extend in the row direction for each row of the pixels, and is electrically coupled to the drive electrode; a control device that performs image display control so as to apply the common potential to the drive electrodes based on an image signal to achieve the image display function of the display function layer, and that performs touch detection control so as to supply a drive signal for touch to the drive electrodes; a touch detection electrode that faces the drive electrodes and forms a capacitance with the drive electrodes; and a touch detection unit that detects a position of a proximity object based on a detection signal sent from the touch detection electrode.

According to another aspect, an electronic apparatus includes the display device with a touch detection function.

Additional features and advantages are described herein, and will be apparent from the following Detailed Description and the figures.

BRIEF DESCRIPTION OF THE FIGURES

FIG. 25 is a diagram of an example of an electronic apparatus to which the display device with a touch detection function according to the present embodiment is applied.

DETAILED DESCRIPTION

Figure 1:
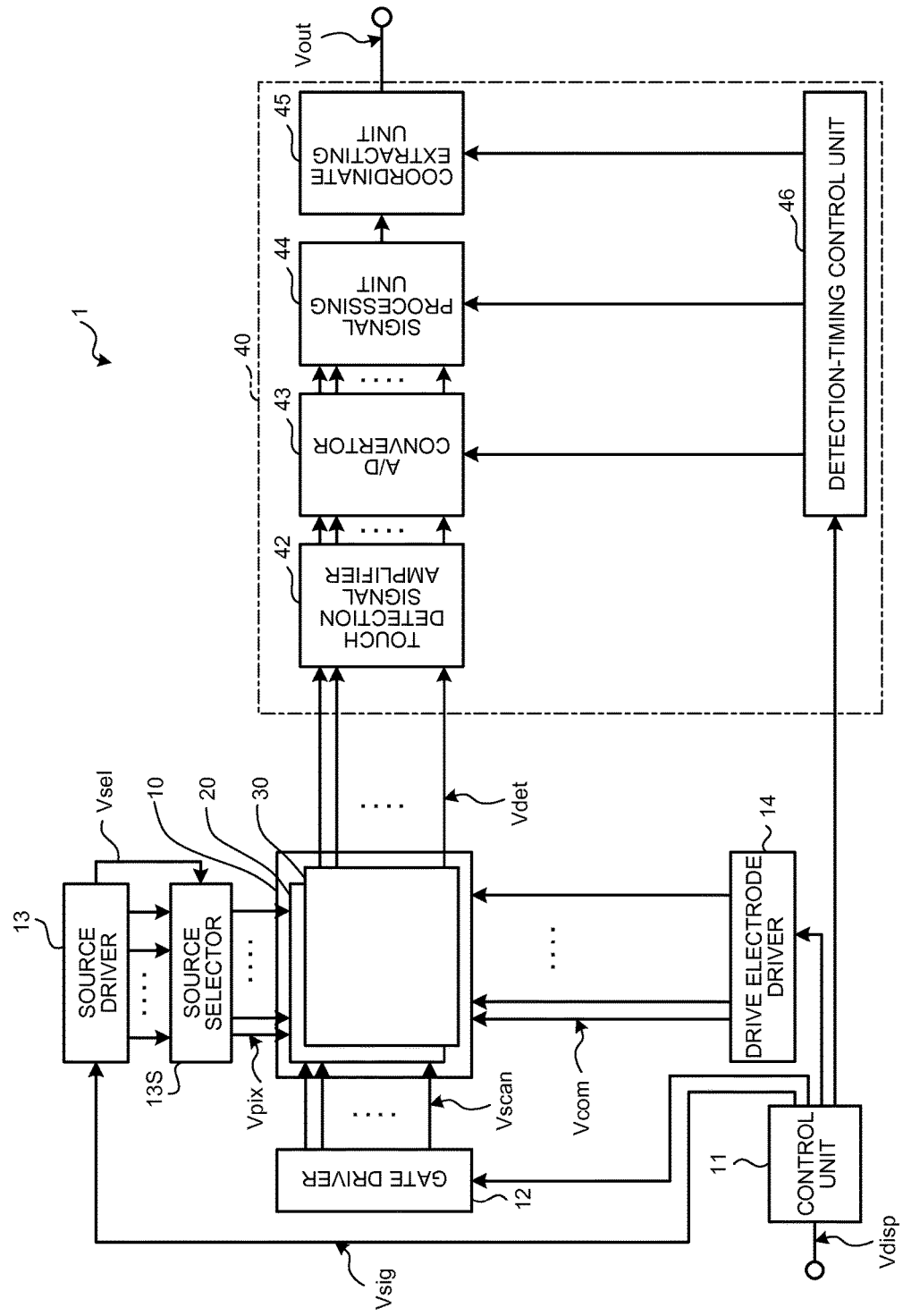
FIG. 1 is a block diagram of a configuration example of a display device with a touch detection function according to an embodiment.

Exemplary embodiments for implementing the present invention will be explained in detail below with reference to the accompanying drawings. The present invention is not limited by the contents described in the following embodiments. In addition, the components described as follows include those which can be easily thought of by persons skilled in the art and those which are substantially equivalent to each other. Moreover, the components described as follows can be arbitrarily combined with each other. The disclosure is only an example, and therefore modifications within the gist of the invention which can be readily thought of by persons skilled in the art are obviously included in the scope of the present invention. Moreover, the widths, the thicknesses, the shapes, and the like of units in the drawings may be schematically represented as compared with those of actual aspects for the sake of clearer description. However, these representations are only examples, and therefore the interpretation of the present invention is not limited thereby. In the present specification and the figures, the same signs are assigned to the same elements as those in already described figures, and detailed explanation may be omitted from time to time.

FIG. 1 is a block diagram of a configuration example of a display device with a touch detection function according to an embodiment. A display device 1 with a touch detection function includes a display unit 10 with a touch detection function, a control unit 11, a gate driver 12, a source driver 13, a source selector 13S, a drive electrode driver 14, and a touch detection unit 40. The display device 1 with a touch detection function is a display device in which the display unit 10 with a touch detection function has a built-in touch detection function. The display unit 10 with a touch detection function is a so-called in-cell type device in which a liquid-crystal display unit 20 using a liquid crystal element as a display element and a capacitive-type touch detection device 30 are integrated. The display unit 10 with a touch detection function may be a so-called on-cell type device in which the capacitive-type touch detection device 30 is mounted on the liquid-crystal display unit 20 that uses a liquid crystal element as a display element.

The liquid-crystal display unit 20 is a device that sequentially scans and displays horizontal lines one by one according to a scan signal Vscan supplied from the gate driver 12, as explained later. The control unit 11 is a circuit that controls so as to supply a control signal to the gate driver 12, the source driver 13, the drive electrode driver 14, and the touch detection unit 40 based on a video signal Vdisp supplied from an external device, and so that these units operate in synchronization with one another. The control device according to the present invention includes the control unit 11, the gate driver 12, the source driver 13, and the drive electrode driver 14.

The gate driver 12 has a function of sequentially selecting one horizontal line as a target of display driving of the display unit 10 with a touch detection function, based on the control signal supplied from the control unit 11.

The source driver 13 is a circuit that supplies a pixel signal Vpix to each pixel Pix (sub-pixels SPix), explained later, of the display unit 10 with a touch detection function based on the control signal supplied from the control unit 11. As explained later, the source driver 13 generates a pixel signal, in which the pixel signal Vpix for a plurality of sub-pixels SPix in the liquid crystal display unit 20 is time-division multiplexed, from the video signal Vdisp for one horizontal line, and supplies the generated pixel signal to the source selector 13S. The source driver 13 also generates a switch control signal Vsel required to divide the pixel signal Vpix multiplexed on an image signal Vsig therefrom, and supplies the generated switch control signal along with the pixel signal Vpix to the source selector 13S. The source selector 13S enables reduction in the number of wirings between the source driver 13 and the control unit 11.

The drive electrode driver 14 is a circuit that supplies a drive signal for touch detection (drive signal for touch; hereinafter, "drive signal" or "touch drive signal") VcomAC and a drive voltage for display (hereinafter, "drive voltage" or "display drive voltage") VcomDC being a voltage for display to a drive electrode COML, which are explained later, of the display unit 10 with a touch detection function based on the control signal supplied from the control unit 11.

The touch detection unit 40 is a circuit that detects the presence or absence of a touch (contact state, explained later) performed on the touch detection device 30 based on the control signal supplied from the control unit 11 and a touch detection signal Vdet supplied from the touch detection device 30 of the display unit 10 with a touch detection function, and that calculates coordinates and the like of the touch in a touch detection area when the presence of a touch is detected. The touch detection unit 40 includes a touch detection signal amplifier 42, an analog-to-digital (A/D) convertor 43, a signal processing unit 44, a coordinate extracting unit 45, and a detection-timing control unit 46.

The touch detection signal amplifier 42 amplifies the touch detection signal Vdet supplied from the touch detection device 30. The touch detection signal amplifier 42 may include a low-pass analog filter that removes a high frequency component (noise component) contained in the touch detection signal Vdet, extracts touch components, and outputs the touch components.

Basic Principle of Capacitive-Type Touch Detection

Figure 2:
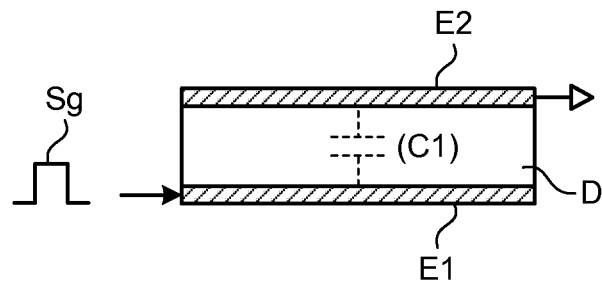
FIG. 2 is an explanatory diagram illustrating a state where no finger is in contact with or in proximity to a device for explanation of the basic principle of capacitive-type touch detection.
Figure 3:
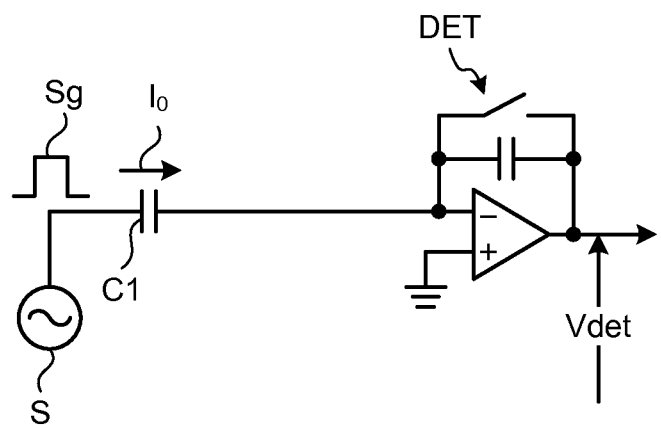
FIG. 3 is an explanatory diagram of an example of an equivalent circuit in the state where no finger is in contact with or in proximity to a device illustrated in FIG. 2.
Figure 4:
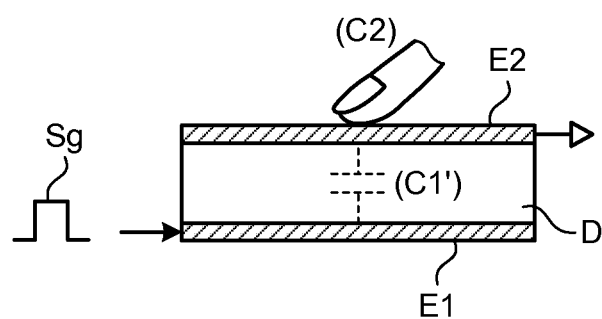
FIG. 4 is an explanatory diagram illustrating a state where a finger is in contact with or in proximity to a device for explanation of the basic principle of a capacitive-type touch detection method.
Figure 5:
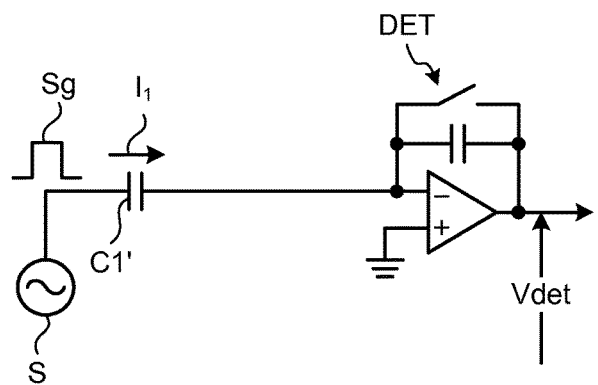
FIG. 5 is an explanatory diagram of an example of the equivalent circuit in the state where the finger is in contact with or in proximity to a device illustrated in FIG. 4.
Figure 6:
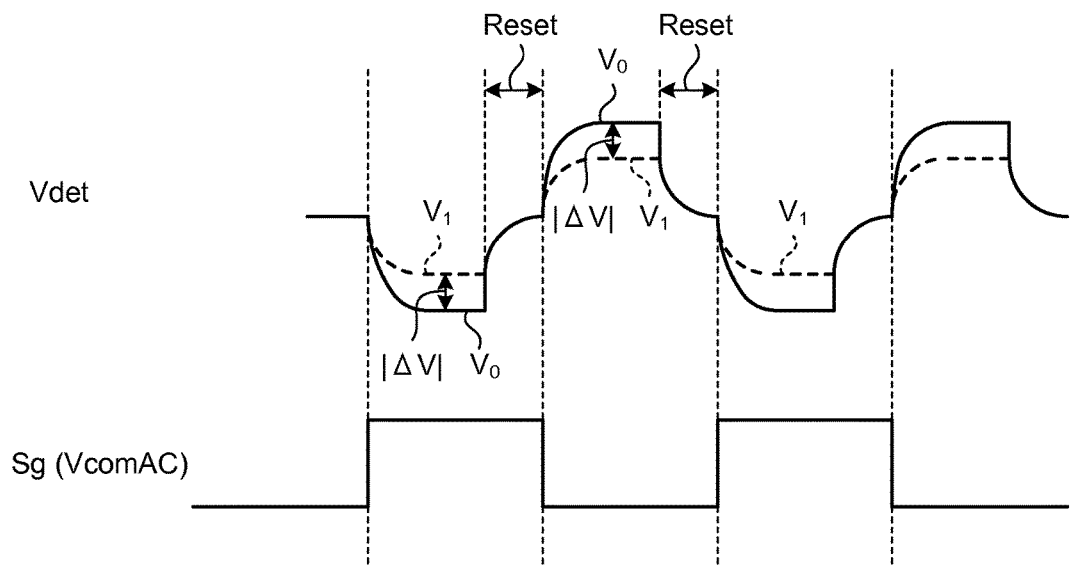
FIG. 6 is a diagram of an example of waveforms of a drive signal and a touch detection signal.

The touch detection device 30 operates based on the basic principle of capacitive-type touch detection, and outputs the touch detection signal Vdet. The basic principle of the touch detection in the display device 1 with a touch detection function according to the present embodiment will be explained below with reference to FIG. 1 to FIG. 6. FIG. 2 is an explanatory diagram illustrating a state where no finger is in contact with or in proximity to a device for explanation of the basic principle of the capacitive-type touch detection. FIG. 3 is an explanatory diagram of an example of an equivalent circuit in the state where no finger is in contact with or in proximity to a device illustrated in FIG. 2. FIG. 4 is an explanatory diagram illustrating a state where a finger is in contact with or in proximity to a device for explanation of the basic principle of the capacitive-type touch detection. FIG. 5 is an explanatory diagram of an example of the equivalent circuit in the state where the finger is in contact with or in proximity to a device illustrated in FIG. 4. FIG. 6 is a diagram of an example of waveforms of a drive signal and a touch detection signal. In the following explanation, a proximity object explained as the finger is not limited to the finger, and a pen type tool or the like may be used.

For example, as illustrated in FIG. 2, a capacitive element C1 includes a pair of electrodes, a drive electrode E1 and a touch detection electrode E2, which are arranged opposite to each other across a dielectric body D. As illustrated in FIG. 3, the capacitive element C1 is coupled at its one end to an alternating-current (AC) signal source (drive signal source) S and is coupled at the other end to a voltage detector (touch detection unit) DET. The voltage detector DET is an integration circuit included in, for example, the touch detection signal amplifier 42 illustrated in FIG. 1.

When an AC square wave Sg of a predetermined frequency (e.g., about several kHz to several hundreds of kHz) is applied from the AC signal source S to the drive electrode E1 (one end of the capacitive element C1), an output waveform (touch detection signal Vdet) appears via the voltage detector DET coupled to the touch detection electrode E2 (the other end of the capacitive element C1). The AC square wave Sg corresponds to the drive signal VcomAC explained later.

In the state where no finger is in contact with (or in proximity to) a device (a non-contact state), a current $I_0$ according to the capacitance of the capacitive element C1 flows in association with charge and discharge to the capacitive element C1 as illustrated in FIG. 2 and FIG. 3. The voltage detector DET illustrated in FIG. 3 converts the fluctuation of the current $I_0$ according to the AC square wave Sg into the fluctuation of a voltage (waveform $V_0$ indicated by solid line in FIG. 6).

On the other hand, in the state where the finger is in contact with (or in proximity to) a device (a contact state), as illustrated in FIG. 4, a capacitance C2 formed by the finger is in contact with or in proximity to the touch detection electrode E2, and a capacitance for a fringe between the drive electrode E1 and the touch detection electrode E2 is thereby blocked to act as a capacitive element C1' having a capacitance smaller than that of the capacitive element C1. It is understood from the equivalent circuit illustrated in FIG. 5 that a current $I_1$ flows in the capacitive element C1'. As illustrated in FIG. 6, the voltage detector DET converts the fluctuation of the current $I_1$ according to the AC square wave Sg into the fluctuation of a voltage (waveform $V_1$ indicated by dotted line). In this case, the amplitude of the waveform $V_1$ becomes lower as compared with that of the waveform $V_0$. Thereby, an absolute value $|\Delta V|$ of a voltage difference between the waveform $V_0$ and the waveform $V_1$ changes according to the influence of an object approaching from the outside such as a finger. To accurately detect the absolute value $|\Delta V|$ of the voltage difference between the waveform $V_0$ and the waveform $V_1$, it is more preferable that the voltage detector DET operates by providing periods Reset in which charge and discharge of the capacitor are reset in synchronization with the frequency of the AC square wave Sg through switching in the circuit.

The touch detection device 30 illustrated in FIG. 1 is configured to sequentially scan detection blocks one by one and perform touch detection according to a drive signal Vcom (drive signal VcomAC, explained later) supplied from the drive electrode driver 14.

The touch detection device 30 is configured to output the touch detection signal Vdet for each detection block from a plurality of touch detection electrodes TDL, explained later, via the voltage detector DET illustrated in FIG. 3 or FIG. 5 to be supplied to the A/D convertor 43 of the touch detection unit 40.

The A/D convertor 43 is a circuit that samples each analog signal output from the touch detection signal amplifier 42 at a timing synchronized with the drive signal VcomAC and converts the sampled signal into a digital signal.

The signal processing unit 44 includes a digital filter that reduces any frequency component (noise component), included in the output signal of the A/D convertor 43, other than the frequency at which the drive signal VcomAC is sampled. The signal processing unit 44 is a logic circuit that detects the presence or absence of a touch performed on the touch detection device 30 based on the output signal of the A/D convertor 43. The signal processing unit 44 performs processing of extracting only a difference of the voltages caused by the finger. The difference of the voltages caused by the finger is the absolute value |ΔV| of the difference between the waveform $V_0$ and the waveform $V_1$. The signal processing unit 44 may perform an operation of averaging absolute values |ΔV| per one detection block to calculate an average value of the absolute values |ΔV|. This enables the signal processing unit 44 to reduce the influence caused by the noise. The signal processing unit 44 compares the detected difference of the voltages caused by the finger with a predetermined threshold voltage, and determines, if the difference of the voltages is the threshold voltage or more, that the external proximity object is in the contact state. Meanwhile, if the difference of the voltages is less than the threshold voltage, the signal processing unit 44 determines that the external proximity object is in the non-contact state. In this way, the touch detection unit 40 enables touch detection.

The coordinate extracting unit 45 is a logic circuit that calculates, when the signal processing unit 44 detects a touch, touch panel coordinates of the touch, and outputs the touch panel coordinates as a signal output Vout. The detection-timing control unit 46 synchronizes the A/D convertor 43 and the signal processing unit 44.

Module

Figure 7:
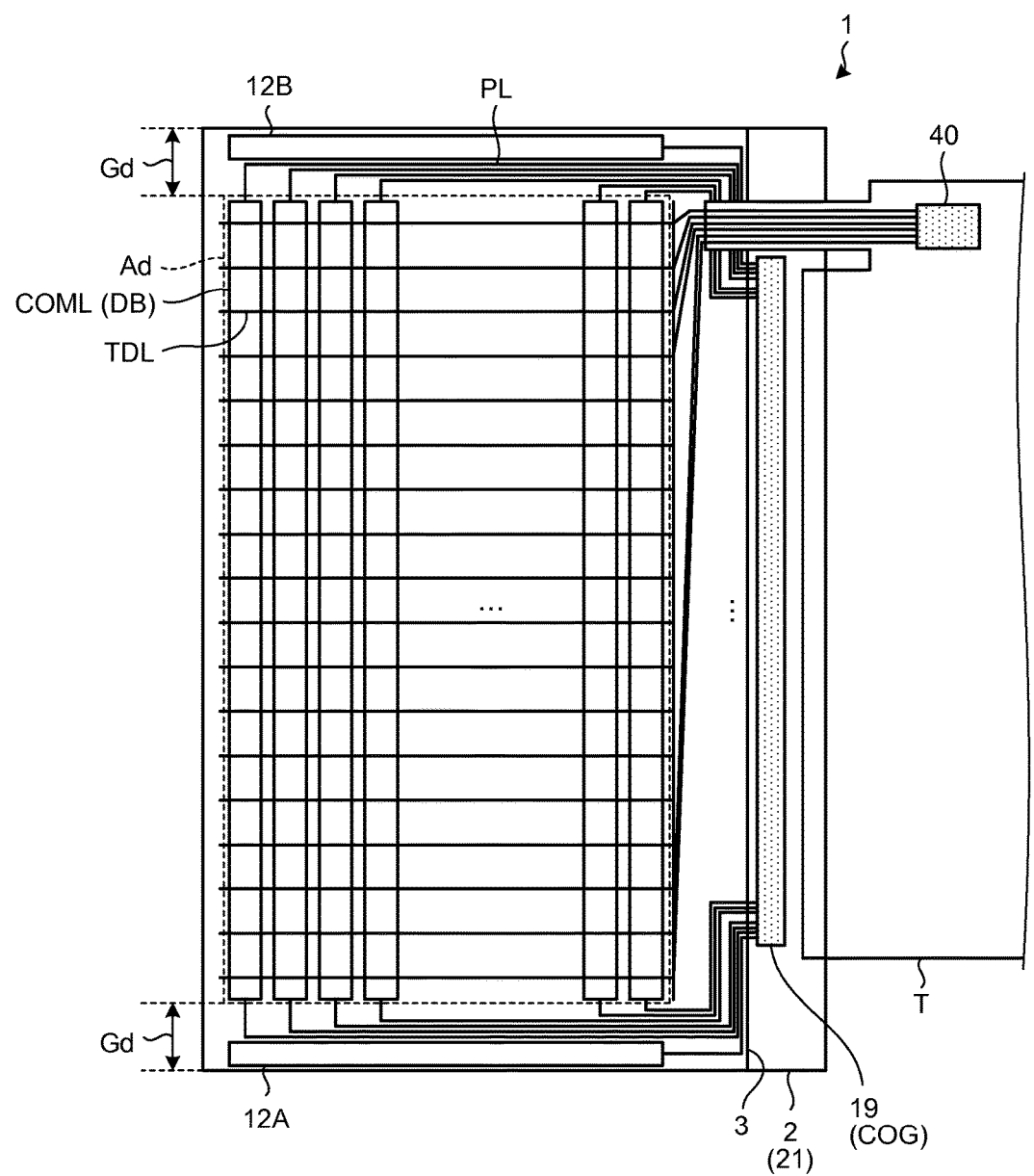
FIG. 7 is a diagram of an example of a module on which the display device with a touch detection function according to the present embodiment is mounted.

FIG. 7 is a diagram of an example of a module on which the display device with a touch detection function according to the present embodiment is mounted. As illustrated in FIG. 7, the display device 1 with a touch detection includes a pixel substrate 2 (translucent substrate 21) and a flexible printed board T, which are explained later. The pixel substrate 2 is provided with Chip On Glass (COG) 19, and has a display area Ad of the liquid crystal display unit 20 and a frame Gd formed thereon. The COG 19 is a driver IC (integrated circuit) chip mounted on the pixel substrate 2 and is a control device with built-in circuits, such as the control unit 11 and the source driver 13 illustrated in FIG. 1, required for a display operation. In the present embodiment, the source driver 13 and the source selector 13S are formed on the pixel substrate 2. The source driver 13 and the source selector 13S may be built into the COG 19. The drive electrode driver 14 is built in the COG 19. The gate driver 12 is formed on the pixel substrate 2 as gate drivers 12A and 12B.

As illustrated in FIG. 7, a drive electrode block DB of the drive electrode COML and the touch detection electrode TDL are formed so as to three-dimensionally intersect each other in a direction perpendicular to the surface of the pixel substrate 2.

The drive electrodes COML are divided into a plurality of stripe-shaped electrode patterns extending along one direction. When a touch detection operation is performed, the drive electrode driver 14 sequentially supplies the drive signal VcomAC to each of the electrode patterns. The stripe-shaped electrode patterns of the drive electrodes COML simultaneously supplied with the drive signal VcomAC represent the drive electrode block DB illustrated in FIG. 7. The drive electrode block DB (drive electrode COML) is formed along a long-side direction of the display unit 10 with a touch detection function, and the touch detection electrode TDL, explained later, is formed along a short-side direction of the display unit 10 with a touch detection function. An output end of the touch detection electrode TDL is provided on the short-side side of the display unit 10 with a touch detection function and is coupled to the touch detection unit 40 mounted on the flexible printed board T via the flexible printed board T. In this way, the touch detection unit 40 is mounted on the flexible printed board T and is coupled to each of the touch detection electrodes TDL arranged in parallel. The flexible printed board T may be any terminal and is not therefore limited to the flexible printed board, and, in this case, the touch detection unit 40 is provided outside the module.

The source selector 13S is formed near the display area Ad on the pixel substrate 2 using a thin film transistor (TFT) element. A large number of pixels Pix, explained later, are arranged in a matrix (in the form of rows and columns) in the display area Ad. The frames Gd and Gd are areas where no pixels Pix are arranged when the surface of the pixel substrate 2 is viewed from the direction perpendicular thereto.

The gate driver 12 includes the gate drivers 12A and 12B and is formed on the pixel substrate 2 using the TFT element. The gate drivers 12A and 12B are configured so as to be capable of driving the display area Ad from both sides of the display area Ad where the sub-pixels SPix (pixels), explained later, are arranged in a matrix. In the following explanation, the gate driver 12A is described as a first gate driver 12A and the gate driver 12B is described as a second gate driver 12B. Scan lines GCL, which are explained later, are arranged between the first gate driver 12A and the second gate driver 12B. Therefore, the scan lines GCL explained later are provided so as to extend along a direction parallel to the extending direction of the drive electrodes COML in the direction perpendicular to the surface of the pixel substrate 2.

The drive electrode driver 14 supplies power to the drive electrode block DB via a potential supply wiring. In other words, the drive electrode block DB is supplied with the display drive voltage VcomDC via potential supply wirings PL, and is also supplied with the drive signal VcomAC via the potential supply wirings PL. The potential supply wirings PL are wirings formed of a conductive metal material, routed in the frames Gd and Gd. Each of the drive electrode blocks DB arranged in parallel is then driven from its both sides. The potential supply wiring PL supplying the display drive voltage VcomDC and the potential supply wiring PL supplying the drive signal VcomAC are the same wirings; however, these wirings may be provided as separate wirings.

The display device 1 with a touch detection function illustrated in FIG. 7 outputs the touch detection signals Vdet from the short-side side of the display unit 10 with a touch detection function. This makes easier the routing of the wirings, in the display device 1 with a touch detection function, which are coupled to the touch detection unit 40 via the flexible printed board T serving as a terminal unit.

Display Unit with Touch Detection Function

Figure 8:
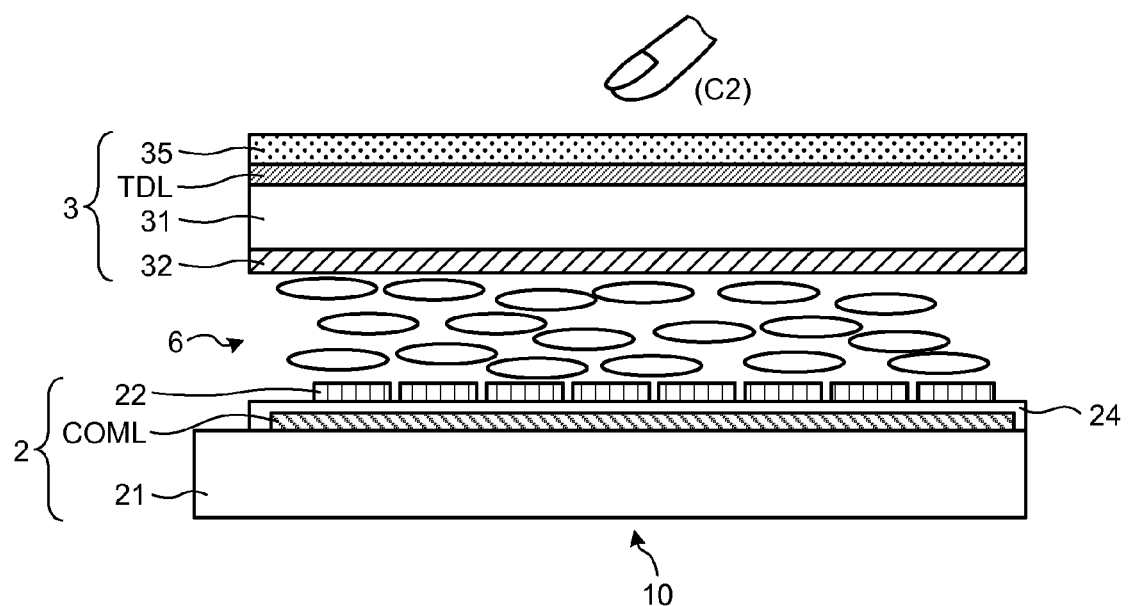
FIG. 8 is a cross-sectional view of a schematic cross-section structure of a display unit with a touch detection function according to the present embodiment.
Figure 9:
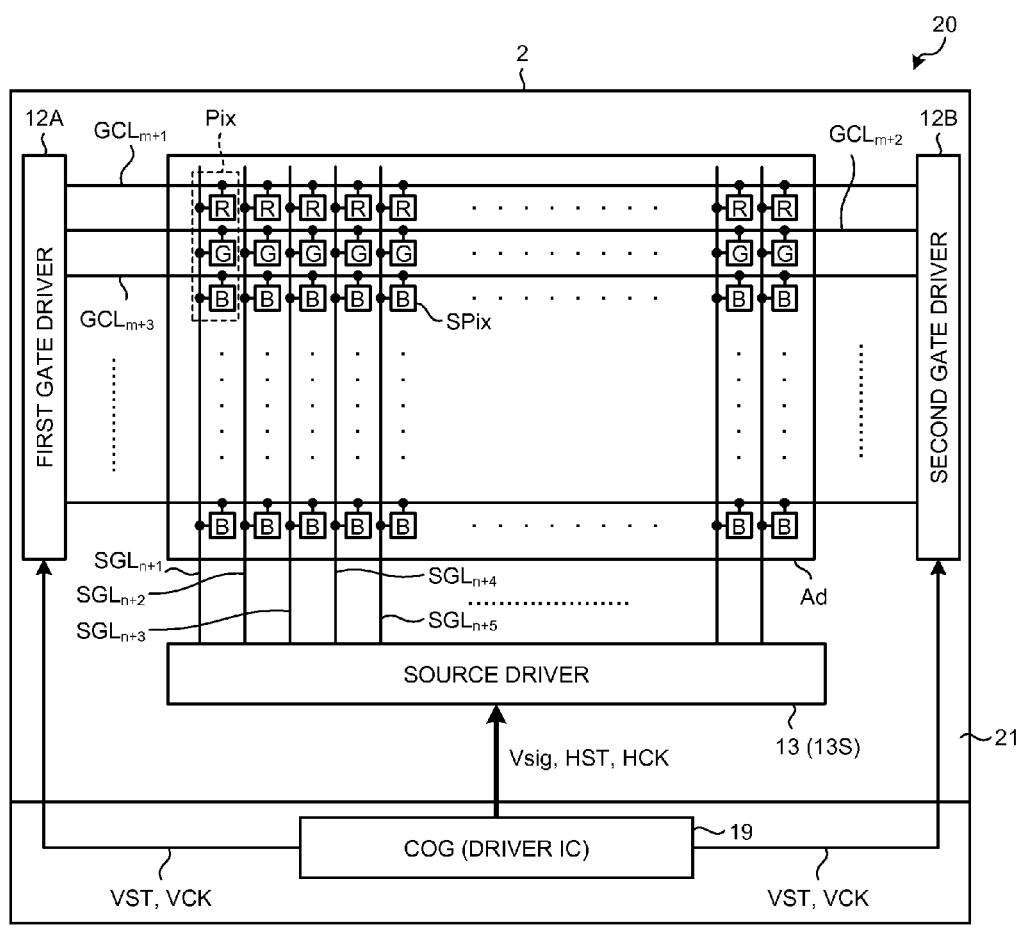
FIG. 9 is a diagram of an example of a control device for the display device with a touch detection function according to the present embodiment.
Figure 10:
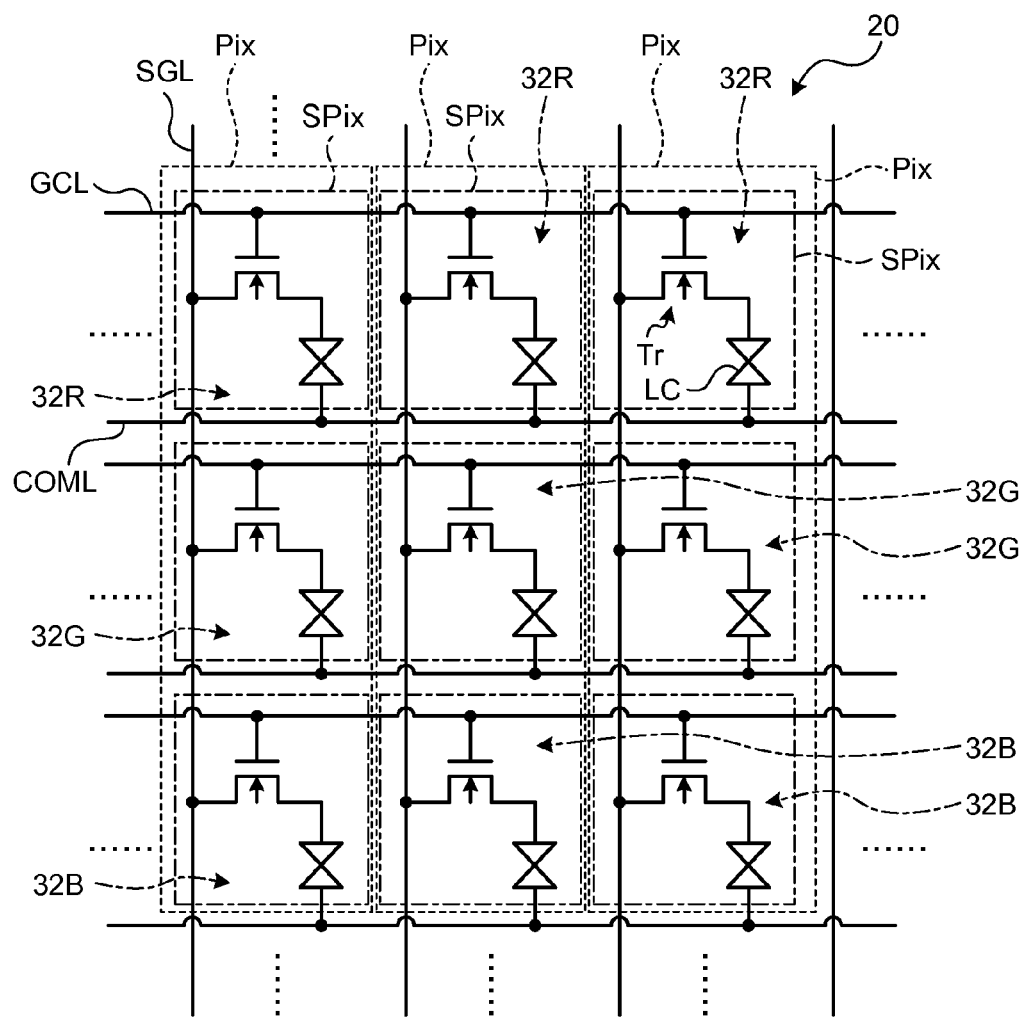
FIG. 10 is a circuit diagram of a pixel array of the display unit with a touch detection function according to the present embodiment.

A configuration example of the display unit 10 with a touch detection function will be explained in detail next. FIG. 8 is a cross-sectional view of a schematic cross-section structure of the display unit with a touch detection function according to the present embodiment. FIG. 9 is a diagram of an example of the control device for the display device with a touch detection function according to the present embodiment. FIG. 10 is a circuit diagram of a pixel array of the display unit with a touch detection function according to the present embodiment.

As illustrated in FIG. 8, the display unit 10 with a touch detection function includes the pixel substrate 2, a counter substrate 3 arranged facing the pixel substrate 2 in the direction perpendicular to the surface of the pixel substrate 2, and a liquid crystal layer 6 inserted between the pixel substrate 2 and the counter substrate 3.

The liquid crystal layer 6 modulates the light passing therethrough according to the state of the electric field, and is driven in a horizontal electric field mode such as fringe field switching (FFS) or in-plane switching (IPS). An orientation film may be provided between the liquid crystal layer 6 and the pixel substrate 2 and between the liquid crystal layer 6 and the counter substrate 3 illustrated in FIG. 8.

The counter substrate 3 includes a glass substrate 31 and a color filter 32 formed on one face of the glass substrate 31. The touch detection electrodes TDL being detection electrodes of the touch detection device 30 are formed on the other face of the glass substrate 31, and a polarizer 35 is further disposed on the touch detection electrodes TDL.

The pixel substrate 2 includes the translucent substrate 21 as a circuit board, a plurality of pixel electrodes 22 arranged in a matrix on the translucent substrate 21, a plurality of drive electrodes COML formed between the translucent substrate 21 and the pixel electrodes 22, and an insulating layer 24 that insulates the pixel electrodes 22 and the drive electrodes COML. The drive electrodes COML are electrodes for supplying "common potential" being a reference to a plurality of pixels Pix (explained later). The drive electrode COML functions as a common drive electrode for a liquid crystal display operation and also functions as a drive electrode for a touch detection operation. The insulating layer 24 is formed on the drive electrodes COML, and the pixel electrodes 22 are formed thereon. The pixel electrodes 22 are electrodes for supplying a pixel signal for display, and has translucency. The drive electrodes COML and the pixel electrodes 22 are formed of, for example, indium tin oxide (ITO).

The counter substrate 3 includes the glass substrate 31, the color filter 32, and the touch detection electrodes TDL. The color filter 32 is formed on one face of the glass substrate 31. The color filter 32 is configured to periodically array color filter layers in three colors of, for example, red (R), green (G), and blue (B), and a set of the three colors of R, G, and B is associated with each of display pixels. The touch detection electrodes TDL are formed on the other face of the glass substrate 31. The touch detection electrodes TDL are electrodes formed of, for example, ITO and having translucency. The polarizer 35 is disposed on the touch detection electrodes TDL.

The liquid crystal layer 6 functions as a display function layer and modulates the light passing therethrough according to the state of an electric field. The electric field is formed by a potential difference between a voltage of the drive electrodes COML and a voltage of the pixel electrodes 22. The liquid crystal of the liquid crystal layer 6 is driven in the horizontal electric field mode such as FFS or IPS.

The orientation film is provided respectively between the liquid crystal layer 6 and the pixel substrate 2 and between the liquid crystal layer 6 and the counter substrate 3, and an incident-side polarizer is disposed on the bottom side of the pixel substrate 2. However, these units are omitted herein from the figures.

System Configuration Example of Display Device

The pixel substrate 2 includes the display area Ad, the COG 19 having functions of an interface (I/F) and a timing generator, the first gate driver 12A, the second gate driver 12B, and the source driver 13, which are provided on the translucent substrate 21. The flexible printed board T illustrated in FIG. 7 transmits an external signal to the COG 19 illustrated in FIG. 7 and FIG. 9 or a drive power for driving the COG 19 thereto. The pixel substrate 2 includes the display area Ad which is provided on the surface of the translucent substrate 21 of a translucent insulating substrate (e.g. a glass substrate) and on which a number of pixels including liquid crystal cells are arranged in a matrix (in the form of rows and columns), the source driver (horizontal drive circuit) 13, and the gate drivers (vertical drive circuits) 12A and 12B. The gate drivers (vertical drive circuits) 12A and 12B are arranged so as to sandwich the display area Ad therebetween, as the first gate driver 12A and the second gate driver 12B.

The display area Ad has a matrix (in the form of rows and columns) structure in which the sub-pixels SPix including the liquid crystal layer are arranged in m rows×n columns. In this specification, the row indicates a pixel row having n pieces of sub-pixels SPix arrayed in one direction. The column indicates a pixel column having m pieces of sub-pixels SPix arrayed in a direction perpendicular to the direction in which the rows are arrayed. The values of m and n are determined according to a vertical display resolution and a horizontal display resolution respectively. In the display area Ad, each of scan lines $GCL_{m+1}$, $GCL_{m-2}$, $GCL_{m+}$... is arranged in each row and each of data lines $SGL_{n+1}$, $SGL_{n+2}$, $SGL_{n+3}$, $SGL_{n+4}$, $SGL_{n+5}$... is arranged in each column with respect to an m-row/n-column array of the sub-pixels SPix. In the embodiment, the scan lines $GCL_{m+1}$, $GCL_{m+2}$, $GCL_{m+3}$... may be hereinafter described as scan lines GCL as a representative thereof, and the data lines $SGL_{n+1}$, $SGL_{n+2}$, $SGL_{n+3}$, $SGL_{n+4}$, $SGL_{n+5}$... may be hereinafter described as data lines SGL as a representative thereof.

A master clock, a horizontal synchronization signal, and a vertical synchronization signal, which are external signals input from an external device, are input to the pixel substrate 2 to be supplied to the COG 19. The COG 19 performs level conversion (boosting) of the master clock, the horizontal synchronization signal, and the vertical synchronization signal, each of which has a voltage magnitude of an external power supply, to a voltage magnitude of an internal power supply required for driving the liquid crystal, passes the level-converted master clock, horizontal synchronization signal, and vertical synchronization signal through the timing generator, and generates a vertical start pulse VST, a vertical clock pulse VCK, a horizontal start pulse HST, and a horizontal clock pulse HCK. The COG 19 supplies the vertical start pulse VST and the vertical clock pulse VCK to the first gate driver 12A and the second gate driver 12B, and also supplies the horizontal start pulse HST and the horizontal clock pulse HCK to the source driver 13. The COG 19 generates a drive voltage for display (counter electrode potential) VCOM which is called a common potential and is commonly supplied to pixels with respect to the pixel electrode for each sub-pixel SPix, and supplies the generated common potential to the drive electrodes COML.

The first gate driver 12A and the second gate driver 12B include a shift register, explained later, and may further include a latch circuit and the like. The first gate driver 12A and the second gate driver 12B are supplied with the vertical start pulse VST, and the latch circuit is thereby synchronized with the vertical clock pulse VCK to sequentially sample and latch the display data output from the COG 19 in one horizontal period. The first gate driver 12A and the second gate driver 12B sequentially output the digital data for one line latched in the latch circuit as a vertical scan pulse, and supply the digital data to the scan lines GCL, to thereby sequentially select sub-pixels SPix row by row. The first gate driver 12A and the second gate driver 12B are arranged along the extending direction of the scan lines GCL so as to sandwich the scan lines GCL therebetween. The first gate driver 12A and the second gate driver 12B sequentially output the digital data in the order from an upper side of the display area Ad i.e. from an upper direction of vertical scanning to a lower side of the display area Ad i.e. to a lower direction of the vertical scanning.

The source driver 13 is supplied with, for example, 6-bit R (red), G (green), and B (blue) image signals Vsig. The source driver 13 writes display data to sub-pixels SPix of a row selected through vertical scanning performed by the first gate driver 12A and the second gate driver 12B for each pixel, or for each pixel group including a plurality of pixels, or for all pixels at a time via the data lines SGL.

Formed on the translucent substrate 21 are wirings such as switching elements Tr of the sub-pixels SPix illustrated in FIG. 9 and FIG. 10, the data lines SGL for supplying a pixel signal Vpix to the pixel electrodes 22 illustrated in FIG. 8, and the scan lines GCL for driving the switching elements Tr. In this way, the data lines SGL are extended along a plane parallel to the surface of the translucent substrate 21, and supply the pixel signal Vpix for displaying an image to the pixels. The liquid crystal display unit 20 illustrated in FIG. 10 has the sub-pixels SPix arrayed in the matrix. The sub-pixel SPix includes the switching element Tr and a liquid crystal capacitor LC of the liquid crystal layer. The switching element Tr is an element such as TFT, which is formed of an n-channel metal oxide semiconductor (MOS) TFT having an amorphous silicon semiconductor layer in this example. A source of the switching element Tr is coupled to the data line SGL, a gate thereof is coupled to the scan line GCL, and a drain thereof is coupled to one end of the liquid crystal capacitor LC. The liquid crystal capacitor LC is coupled at its one end to the drain of the switching element Tr, and is coupled at the other end to the drive electrode COML.

The first gate driver 12A and the second gate driver 12B illustrated in FIG. 9 apply a vertical scan pulse to the gates of the switching elements Tr of the sub-pixels SPix through the scan lines GCL illustrated in FIG. 10 to thereby sequentially select one row (one horizontal line), as a target of display driving, from among the sub-pixels SPix formed in the matrix in the display area Ad. The source driver 13 supplies the pixel signal Vpix to each of the sub-pixels SPix included in one horizontal line sequentially selected by the first gate driver 12A and the second gate driver 12B through the data lines SGL. In the sub-pixels SPix, one horizontal line is displayed according to the supplied pixel signal. The drive electrode driver 14 applies the drive signal for display (display drive voltage VcomDC) to drive the drive electrodes COML.

As explained above, the display device 1 with a touch detection function drives the first gate driver 12A and the second gate driver 12B so as to sequentially scan the scan lines $GCL_{m+1}$, $GCL_{m+2}$, and $GCL_{m+3}$, and one horizontal line is thereby sequentially selected. The display device 1 with a touch detection function causes the source driver 13 to supply a pixel signal to the sub-pixels SPix belonging to one horizontal line, and thereby displays the horizontal lines one by one. When performing the display operation, the drive electrode driver 14 applies the drive signal Vcom to the drive electrode COML corresponding to the selected one horizontal line.

The color filter 32 illustrated in FIG. 8 is structured to periodically array color regions of the color filter colored in three colors of, for example, red (R), green (G), and blue (B), and to associate color regions 32R, 32G, and 32B (see FIG. 10) of the three colors of R, G, and B, which are grouped in a set as a pixel Pix, with the sub-pixels SPix illustrated in FIG. 10. The color filter 32 faces the liquid crystal layer 6 in the direction perpendicular to the translucent substrate 21. The color filter 32 may be a combination of other colors if the color regions are colored in different colors.

A sub-pixel SPix illustrated in FIG. 10 is coupled to the other sub-pixels SPix belonging to the same row in the liquid crystal display unit 20 through the scan line GCL. The scan lines GCL are coupled to the gate driver 12 and are supplied with the scan signal Vscan from the gate driver 12. A sub-pixel SPix is coupled to the other sub-pixels SPix belonging to the same column in the liquid crystal display unit 20 through the data line SGL. The data lines SGL are coupled to the source driver 13 and are supplied with the pixel signal Vpix from the source driver 13.

A sub-pixel SPix is coupled to the other sub-pixels SPix belonging to the same row in the liquid crystal display unit 20 through the drive electrode COML. The drive electrode COML is coupled to the drive electrode driver 14 and is supplied with the display drive voltage VcomDC from the drive electrode driver 14. In other words, in this example, the sub-pixels SPix belonging to the same row share the drive electrode COML.

The gate driver 12 illustrated in FIG. 1 applies the scan signal Vscan to the gates of the switching elements Tr in the sub-pixels SPix through the scan line GCL illustrated in FIG. 10 to thereby sequentially select one row (one horizontal line), as a target of display driving, from among the sub-pixels SPix formed in the matrix in the liquid crystal display unit 20. The source driver 13 illustrated in FIG. 1 supplies the pixel signals Vpix to the sub-pixels SPix forming one horizontal line sequentially selected by the gate driver 12 through the respective data lines SGL illustrated in FIG. 10. In the sub-pixels SPix, one horizontal line is displayed according to the supplied pixel signals Vpix. The drive electrode driver 14 illustrated in FIG. 1 applies the drive signals Vcom to the drive electrodes COML to drive the drive electrodes COML in each drive electrode block DB including a predetermined number of drive electrodes COML as illustrated in FIG. 7 and FIG. 9.

As explained above, the liquid crystal display unit 20 drives the gate driver 12 so as to time-divisionally and sequentially scan the scan lines GCL, and one horizontal line is thereby sequentially selected. In the liquid crystal display unit 20, the source driver 13 supplies the pixel signals Vpix to the sub-pixels SPix belonging to the one horizontal line, and the horizontal line is thereby displayed one by one. When performing the display operation, the drive electrode driver 14 applies the display drive voltage VcomDC to the drive electrode block DB including the drive electrodes COML each corresponding to the one horizontal line.

Figure 11:
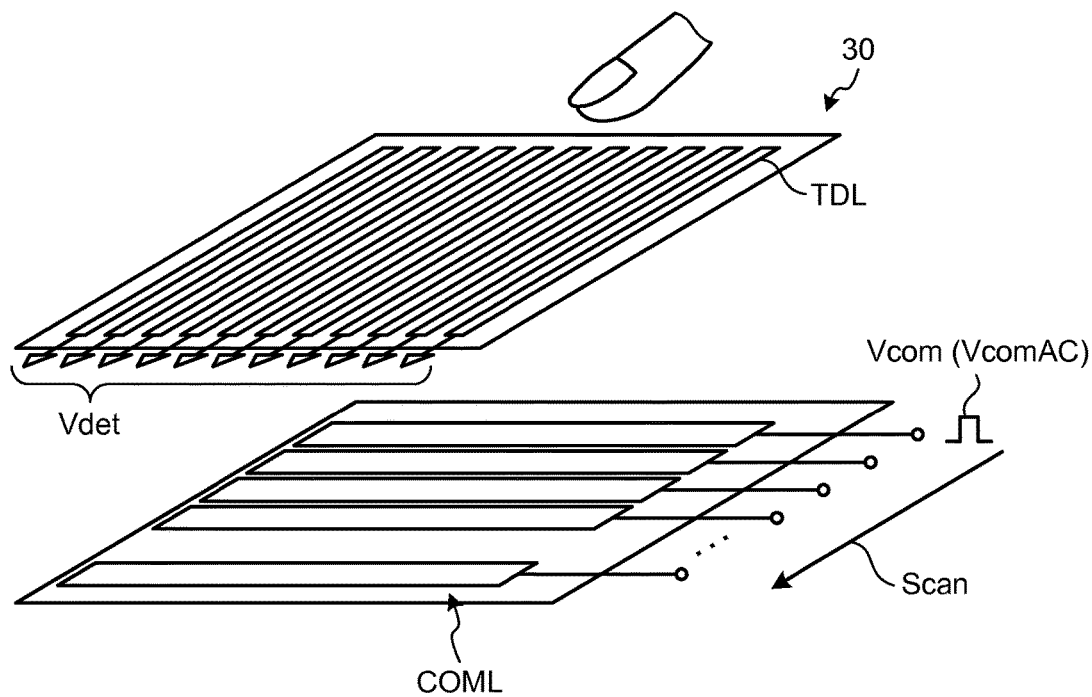
FIG. 11 is a perspective view of a configuration example of drive electrodes and touch detection electrodes of the display unit with a touch detection function according to the present embodiment.

The drive electrode COML according to the present embodiment functions as a drive electrode of the liquid crystal display unit 20 and also functions as a drive electrode of the touch detection device 30. FIG. 11 is a perspective view of a configuration example of drive electrodes and touch detection electrodes of the display unit with a touch detection function according to the present embodiment. The drive electrodes COML illustrated in FIG. 11 face the pixel electrodes 22 in the direction perpendicular to the surface of the translucent substrate 21 as illustrated in FIG. 8. The touch detection device 30 includes the drive electrodes COML provided in the pixel substrate 2 and the touch detection electrodes TDL provided in the counter substrate 3. The touch detection electrodes TDL are formed from stripe-shaped electrode patterns extending along a direction intersecting an extending direction of the electrode patterns of the drive electrodes COML. The touch detection electrodes TDL face the drive electrodes COML in the direction perpendicular to the surface of the translucent substrate 21. Each electrode pattern of the touch detection electrodes TDL is coupled to an input of the touch detection signal amplifier 42 of the touch detection unit 40. The electrode pattern in which the drive electrode COML and the touch detection electrode TDL intersect each other produces a capacitance at the intersection. The touch detection electrodes TDL or the drive electrodes COML (drive electrode block DB) are not limited to the stripe shape in which a plurality of stripes are separated from each other. For example, the touch detection electrodes TDL or the drive electrodes COML (drive electrode block DB) may be comb-shaped. Alternatively, the touch detection electrodes TDL or the drive electrodes COML (drive electrode block DB) have only to be separated from each other, and therefore the shape of each slit that separates the drive electrodes COML may be a straight line or a curve line.

With this structure, when a touch detection operation is performed in the touch detection device 30, the drive electrode driver 14 drives the drive electrode blocks DB so as to time-divisionally and line-sequentially scan the drive electrode blocks DB illustrated in FIG. 7. Thereby, the drive electrode block DB (one detection block) of the drive electrodes COML is sequentially selected in a scan direction Scan. The touch detection device 30 then outputs the touch detection signal Vdet from each of the touch detection electrodes TDL. In this way, the touch detection device 30 is configured so as to perform the touch detection on the one detection block.

Figure 12:
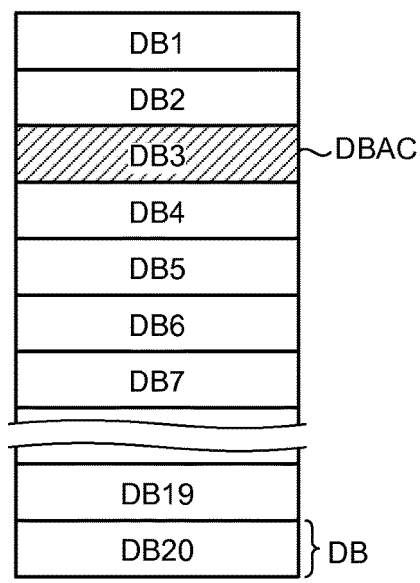
FIG. 12 is a schematic diagram of an operation example of touch detection in the display device with a touch detection function according to the present embodiment.
Figure 13:
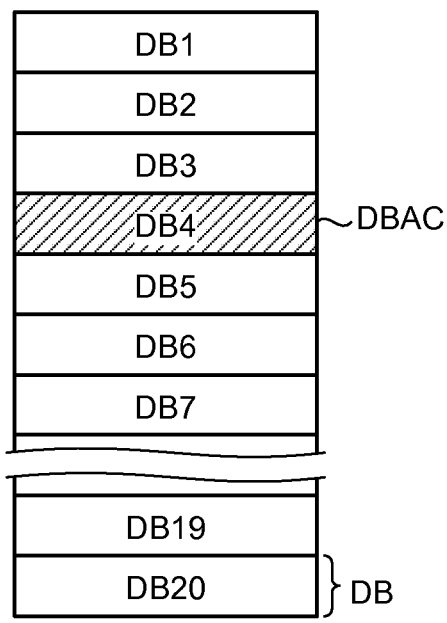
FIG. 13 is a schematic diagram of an operation example of the touch detection in the display device with a touch detection function according to the present embodiment.
Figure 14:
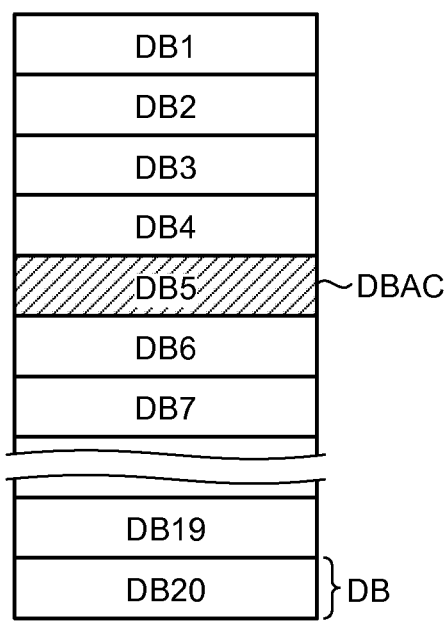
FIG. 14 is a schematic diagram of an operation example of the touch detection in the display device with a touch detection function according to the present embodiment.
Figure 15:
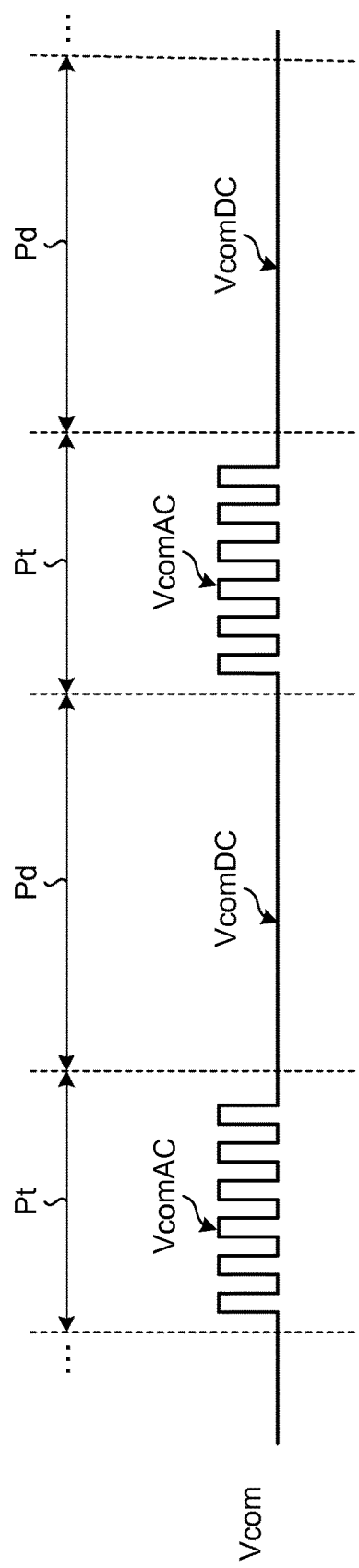
FIG. 15 is an explanatory diagram for explaining an operation of a display and touch detection in the display device with a touch detection function according to the present embodiment.

FIG. 12, FIG. 13, and FIG. 14 are schematic diagrams of an operation example of the touch detection in the display device with a touch detection function according to the present embodiment. FIG. 15 is an explanatory diagram for explaining a display and an operation of touch detection in the display device with a touch detection function according to the present embodiment. When the drive electrode block DB of the drive electrodes COML illustrated in FIG. 7 are 20 drive electrode blocks DB1 to DB20, these figures represent an application operation of the touch drive signal VcomAC to each of the drive electrode blocks DB1 to DB20. A drive signal applied block DBAC represents the drive electrode block DB to which the touch drive signal VcomAC is applied, and the other drive electrode blocks DB are not applied with a voltage to be in a state in which the potential is not fixed, in a so-called floating state. The drive signal applied block DBAC indicates the drive electrode block DB applied with the touch drive signal VcomAC, and the display drive voltage VcomDC is applied may be the other drive electrode blocks DB so that the potential may be fixed. The drive electrode driver 14 illustrated in FIG. 1 selects the drive electrode block DB3 from among the drive electrode blocks DB as a target of touch detection operation illustrated in FIG. 12, and applies the touch drive signal VcomAC thereto. Next, the drive electrode driver 14 selects the drive electrode block DB4 from among the drive electrode blocks DB illustrated in FIG. 13, and applies the touch drive signal VcomAC thereto. The drive electrode driver 14 then selects the drive electrode block DB5 from among the drive electrode blocks DB illustrated in FIG. 14, and applies the touch drive signal VcomAC thereto. In this way, the drive electrode driver 14 sequentially selects the drive electrode block DB, applies the touch drive signal VcomAC thereto, and scans over the entire drive electrode blocks DB. The number of the drive electrode blocks DB is not limited to 20.

In the touch detection device 30, one of the drive electrode blocks DB illustrated in FIG. 12 to FIG. 14 corresponds to the drive electrode E1 based on the basic principle of the capacitive-type touch detection. One of the touch detection electrodes TDL in the touch detection device 30 corresponds to the touch detection electrode E2. The touch detection device 30 is configured to detect a touch according to the basic principle. As illustrated in FIG. 11, by mutually three-dimensionally intersecting electrode patterns, capacitive-type touch sensors are formed into a matrix. Therefore, by scanning over the entire touch detection surface of the touch detection device 30, a position where an external proximity object comes in contact with or is in proximity to the touch detection surface can also be detected.

As illustrated in FIG. 15, the control unit 11 controls so as to supply a control signal to the gate driver 12, the source driver 13, the drive electrode driver 14, and the touch detection unit 40 based on an externally supplied video signal Vdisp and so that these units operate in synchronization with one another. The gate driver 12 supplies the scan signal Vscan to the liquid-crystal display unit 20 in a display operation period Pd illustrated in FIG. 15, and sequentially selects one horizontal line as a target of display driving. The source driver 13 and the source selector 13S supply the pixel signals Vpix to the pixels Pix that form one horizontal line selected by the gate driver 12 in the display operation period Pd.

The drive electrode driver 14 applies the display drive voltage VcomDC to the drive electrode blocks DB according to the one horizontal line in the display operation period Pd. In a touch detection operation period Pt, the drive electrode driver 14 sequentially applies the drive signal VcomAC having a frequency higher than a frequency of the display drive voltage VcomDC to the drive electrode block DB according to the touch detection operation, thus sequentially selecting one detection block. The display unit 10 with a touch detection function performs a display operation in the display operation period Pd based on the signals supplied from the gate driver 12, the source driver 13, and the drive electrode driver 14. The display unit 10 with a touch detection function performs a touch detection operation in the touch detection operation period Pt based on the drive signal VcomAC supplied from the drive electrode driver 14, and outputs the touch detection signal Vdet from the touch detection electrode TDL. The touch detection signal amplifier 42 amplifies and outputs the touch detection signal Vdet. The A/D convertor 43 converts the analog signal output from the touch detection signal amplifier 42 into a digital signal at a timing synchronized with the drive signal VcomAC. The signal processing unit 44 detects the presence or absence of a touch performed on the touch detection device 30 based on the output signal of the A/D convertor 43. When the presence of a touch is detected by the signal processing unit 44, the coordinate extracting unit 45 calculates touch panel coordinates of the touch, and outputs the touch panel coordinates as a signal output Vout.

Auxiliary Wiring

Figure 16:
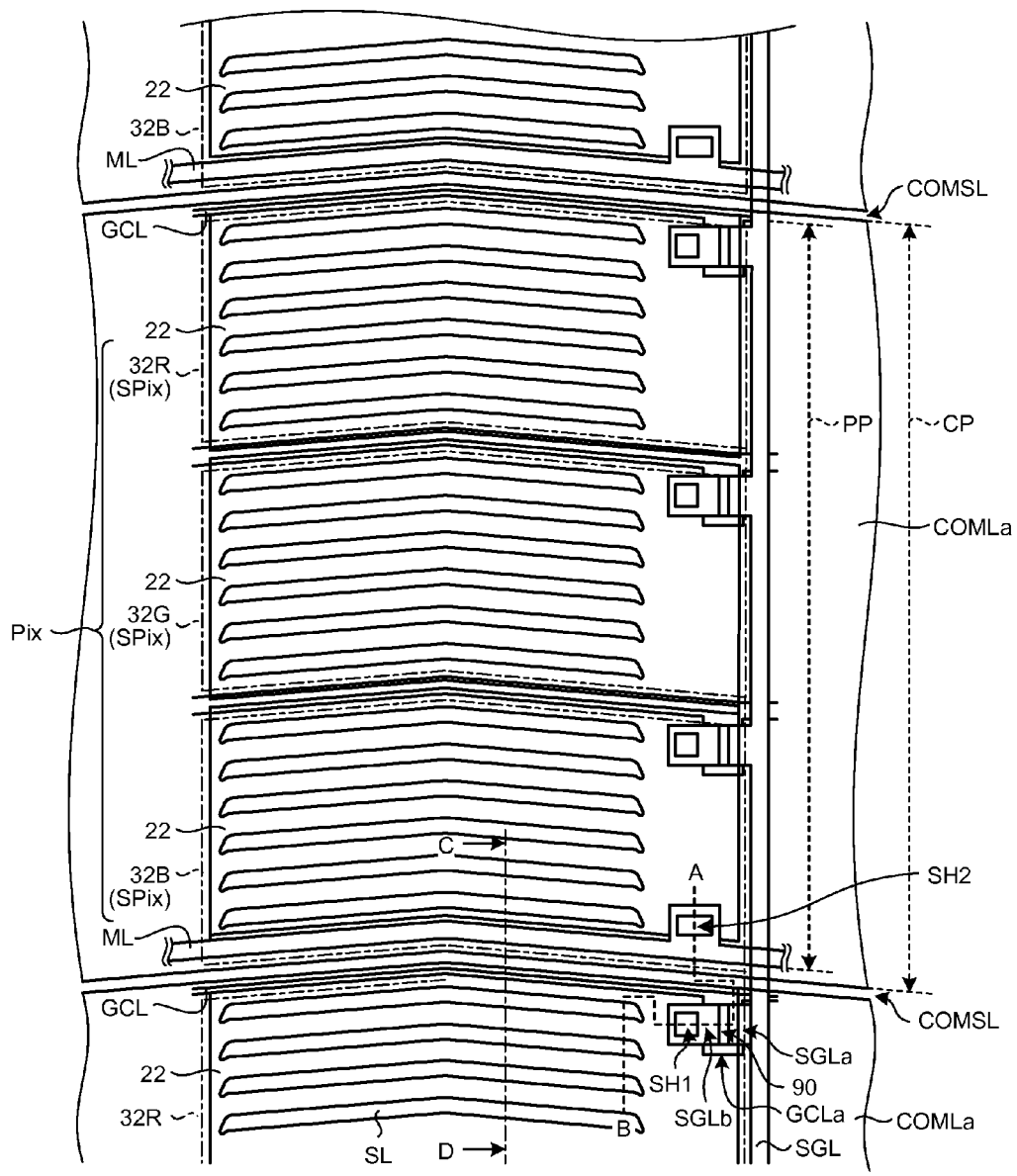
FIG. 16 is an explanatory diagram for explaining a positional relation between a pixel and an auxiliary wiring according to the present embodiment.
Figure 17:
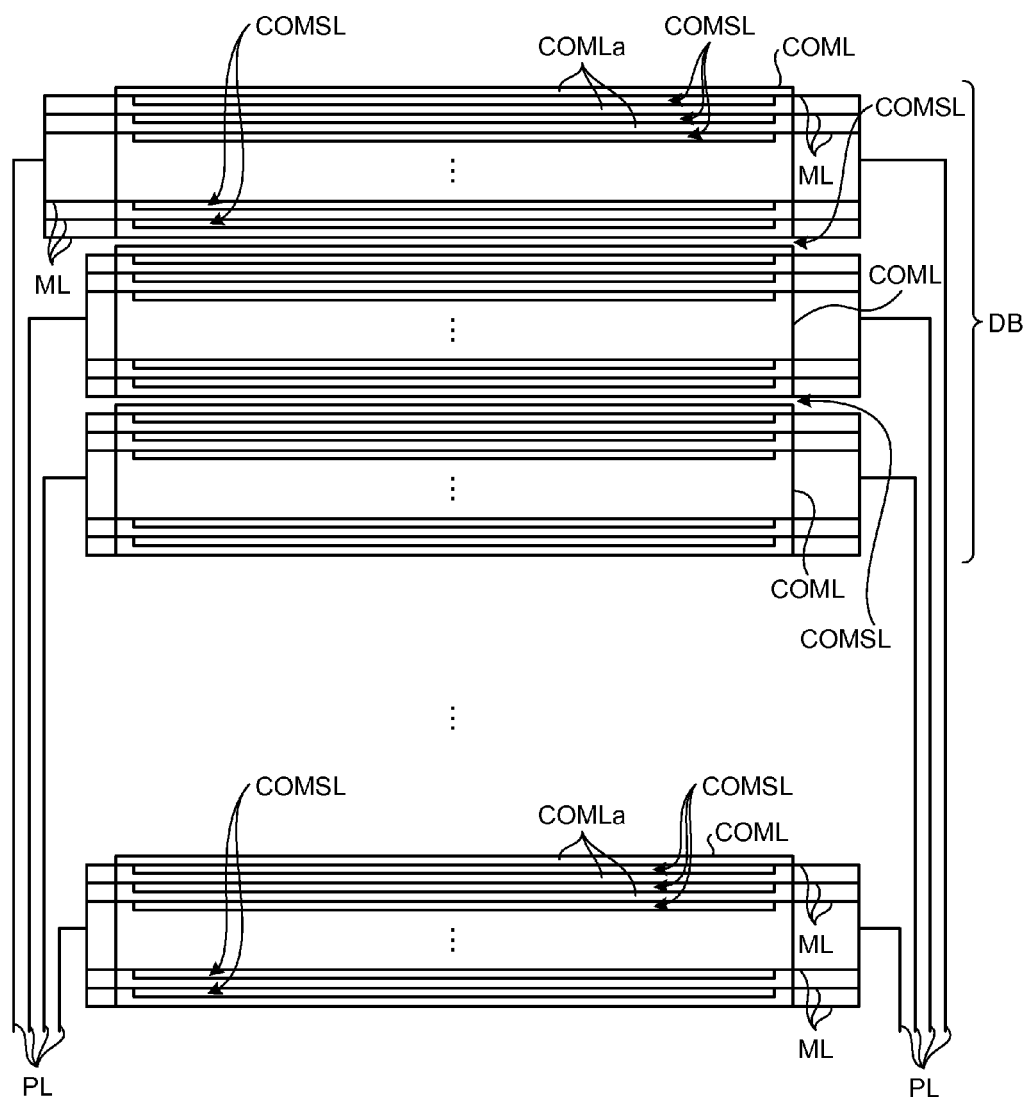
FIG. 17 is an explanatory diagram for explaining a relationship among drive electrodes, drive electrode pieces, slits, and auxiliary wirings according to the present embodiment.
Figure 18:
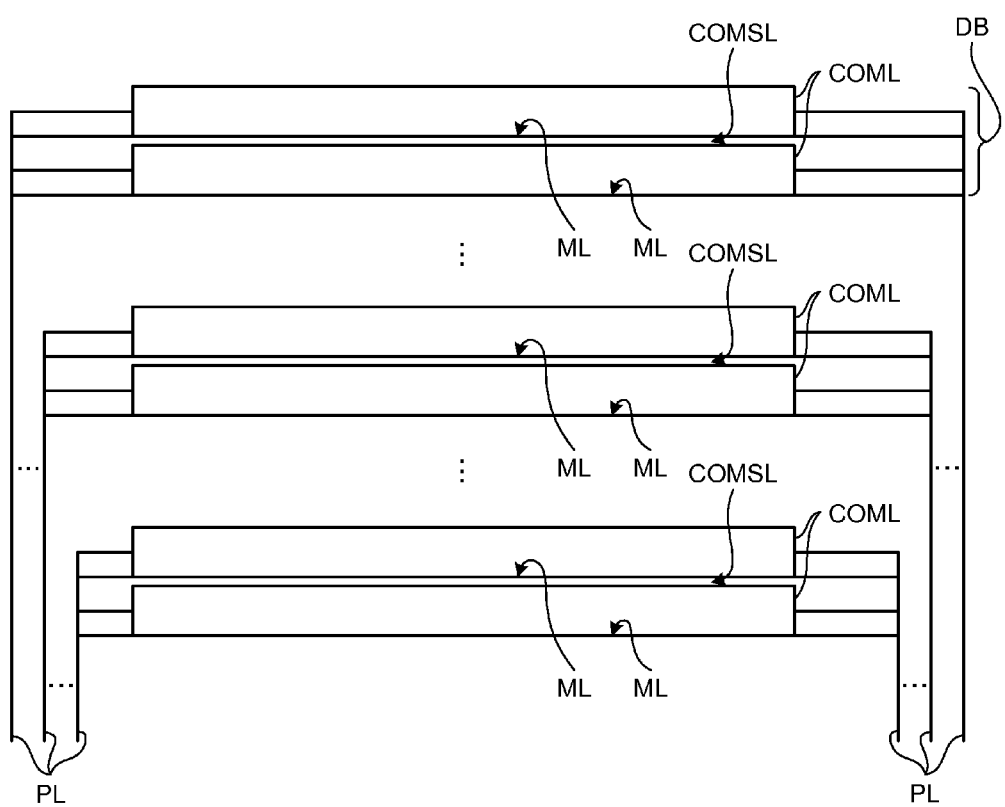
FIG. 18 is an explanatory diagram for explaining a relationship among drive electrodes, drive electrode pieces, slits, and auxiliary wirings according to the present embodiment.

FIG. 16 is an explanatory diagram for explaining a positional relation between a pixel and an auxiliary wiring according to the present embodiment. FIG. 17 and FIG. 18 are explanatory diagrams for explaining a relationship among drive electrodes, drive electrode pieces, slits, and auxiliary wirings according to the present embodiment.

As illustrated in FIG. 16 and FIG. 17, the drive electrode COML is a pattern of a translucent conductive material, and includes a drive electrode piece COMLa where the translucent conductive material is formed, and a slit COMSL where the translucent conductive material is not formed. In one drive electrode COML, a plurality of drive electrode pieces COMLa are formed by at least one slit COMSL of the drive electrode COML. More specifically, the slit COMSL in the drive electrode COML is arranged for each row of the pixels, thereby forming the plurality of drive electrode pieces COMLa each of which has a width of one pixel in the column direction and extends in the row direction. The drive electrode pieces COMLa formed in one drive electrode COML are connected to each other at both ends thereof. In addition to the slit COMSL formed in the drive electrode COML, there is a slit COMSL, where the translucent conductive material is not formed, between adjacent drive electrodes COML, and the slit COMSL, where the translucent conductive material is not formed, separates the adjacent drive electrodes COML. As illustrated in FIG. 17, a plurality of auxiliary wirings ML are arranged for each drive electrode COML. In the example illustrated in FIG. 17, one auxiliary wiring ML is arranged for each drive electrode piece COMLa formed in each drive electrode COML. That is, one auxiliary wiring ML is arranged for each row of the pixels. Each auxiliary wiring ML is formed along the slit COMSL in plan view. As illustrated in FIG. 17, the potential supply wirings PL bundle the drive electrodes COML for each drive electrode block DB and simultaneously supply the drive signal VcomAC to the auxiliary wirings ML.

The drive electrode COML may be a pattern of a translucent conductive material illustrated in FIG. 18. Each drive electrode COML illustrated in FIG. 18 has a width of one pixel in the column direction. In the example illustrated in FIG. 18, there is no slit COMSL in the drive electrodes COML. That is, in this example, one drive electrode piece COMLa illustrated in FIG. 16 corresponds to one drive electrode COML illustrated in FIG. 18. There is a slit COMSL, where the translucent conductive material is not formed, between adjacent drive electrodes COML, and the slit COMSL, where the translucent conductive material is not formed, separates the adjacent drive electrodes COML. At least one auxiliary wirings ML is arranged for each drive electrode COML. In the example illustrate in FIG. 18, with respect to each drive electrode COML, one auxiliary wirings ML is formed along a slit COMSL between adjacent drive electrodes COML in plan view. In addition, as illustrated in FIG. 18, a terminal may be provided at a center portion of a short side of the drive electrode COML, and the terminal of the drive electrode COML may be coupled to the potential supply wirings PL. Thus, the drive signal VcomAC is supplied to the drive electrode COML directly from the potential supply wirings PL aside from the auxiliary wirings ML. With this configuration, the drive signal VcomAC is supplied to the drive electrode COML directly from the potential supply wirings PL, while the drive signal VcomAC is supplied to the drive electrode COML via the auxiliary wirings ML. As illustrated in FIG. 18, the potential supply wirings PL bundle the drive electrodes COML for each drive electrode block DB and simultaneously supplies the drive signal VcomAC to the auxiliary wirings ML. The potential supply wirings PL directly supplies the drive signal VcomAC to the drive electrodes COML for each drive electrode block DB. The structure of the pattern of the translucent conductive material illustrated in FIG. 18 is simplified by repeating the same pattern.

The auxiliary wirings ML illustrated in FIG. 16 to FIG. 18 are formed of a metal material, for example, aluminum (Al), having an electrical resistance lower than that of the translucent conductive material of the drive electrode COML. The auxiliary wiring ML is disposed so as to extend in the row direction for each row of the pixels Pix, to transverse the display area Ad by passing between the frames Gd and Gd. It is preferable that the auxiliary wiring ML is directly and electrically coupled to the potential supply wiring PL. This structure makes the couple resistance be reduced.

The touch drive signal VcomAC is affected by an electrical resistance based on the sheet resistance and the length of the drive electrode COML. When the electrical resistance of the drive electrode COML is high and if the display area Ad is large, influence of a time constant on the touch drive signal VcomAC causes waveform rounding to occur, which may cause noise resistance to be degraded and accuracy of touch detection to be affected. If the semiconductor layer of the switching element Tr is formed of amorphous silicon, it takes longer time to charge for the pixels in the display operation period Pd as compared with polysilicon, and therefore the length of the touch detection operation period Pt may possibly be reduced. The display device 1 with a touch detection function according to the present embodiment includes the auxiliary wirings ML whose electrical resistance is lower than that of the drive electrode COML. Therefore, in the display device 1 with a touch detection function according to the present embodiment, the influence of the time constant exerted on the waveform of the touch drive signal VcomAC supplied to the drive electrodes COML can be suppressed by the auxiliary wirings ML. The display device 1 with a touch detection function according to the present embodiment can increase a transmission speed of the touch drive signal VcomAC supplied to the drive electrodes COML using the auxiliary wirings ML, thus reducing the touch detection operation period Pt. Consequently, the display device 1 with a touch detection function according to the present embodiment allows the improvement in the accuracy of the touch detection and the increase in the display area Ad. However, for the conductivity, the metal material forming the auxiliary wirings ML has a lower electrical resistance than the translucent conductive material such as ITO, but its light blocking effect increases.

For the pixel Pix according to the present embodiment, as illustrated in FIG. 9, FIG. 10, and FIG. 16, in the display area Ad, one pixel Pix includes a plurality of sub-pixels SPix that represent mutually different colors. Arbitrary pixels, which are adjacent to each other in the row direction and in each of which the sub-pixels SPix forming one pixel Pix are arrayed in one column with k rows (k is a natural number of 3 or more), have a pixel array in which arbitrary sub-pixels SPix representing the same color, among the color regions 32R, 32G, and 32B of the three colors of R, G, and B, are arrayed along the row direction. In such a pixel array, an area along the slit COMSL between adjacent pixels Pix in the column direction is an area in which the auxiliary wiring ML hardly affects an aperture ratio even if it passes through the sub-pixels SPix.

Therefore, as illustrated in FIG. 16, the auxiliary wiring ML is arranged in an area along the slit COMSL between adjacent pixels Pix in the column direction, for each row of pixels Pix. Thus, the auxiliary wirings ML is provided in the area that is blocked by a light blocking material such as a black matrix, and therefore the influence on the aperture ratio is suppressed. The auxiliary wiring ML is provided along the scan line GCL adjacent thereto in the column direction. The potential of the auxiliary wiring ML becomes the common potential in the display operation period Pd, and a potential difference with the scan line GCL is produced. The potential difference between the auxiliary wiring ML and the scan line GCL affects the orientation of liquid crystal molecules, which causes burn-in or the like.

Figure 19:
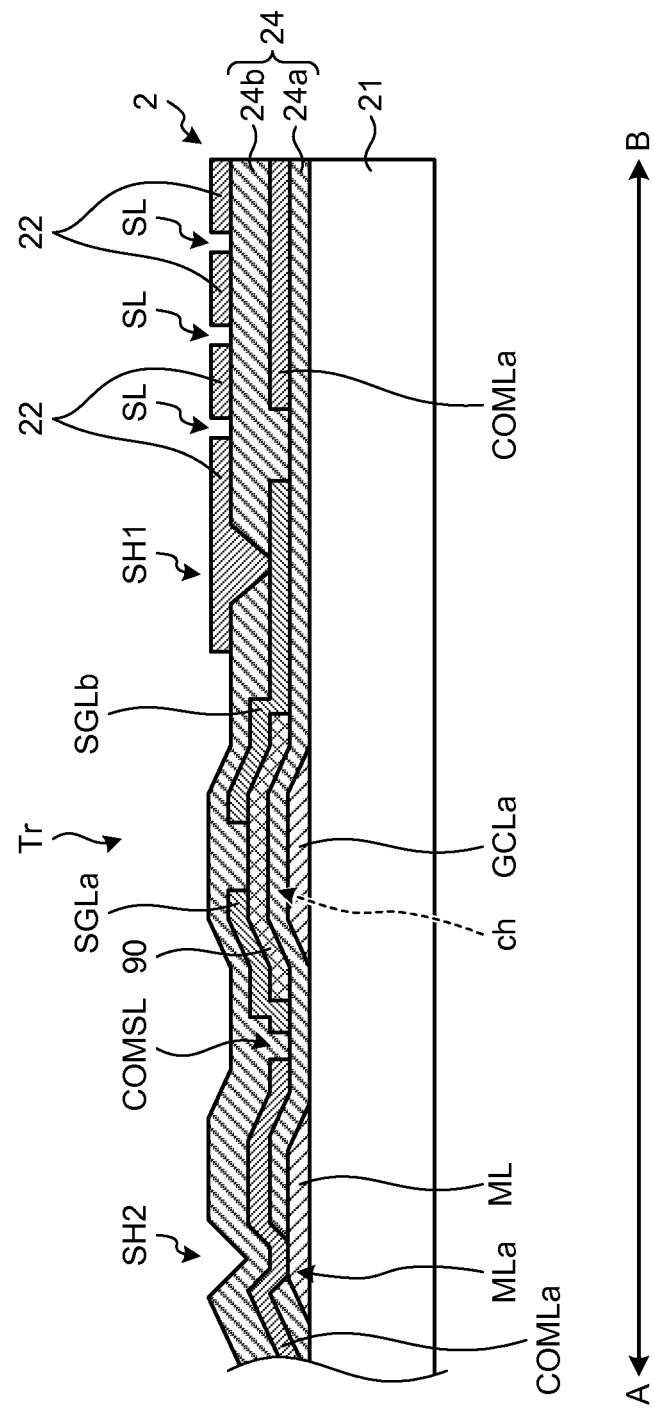
FIG. 19 is a schematic diagram of a cross section schematically illustrating an A-B cross section of a pixel substrate illustrated in FIG. 16.
Figure 20:
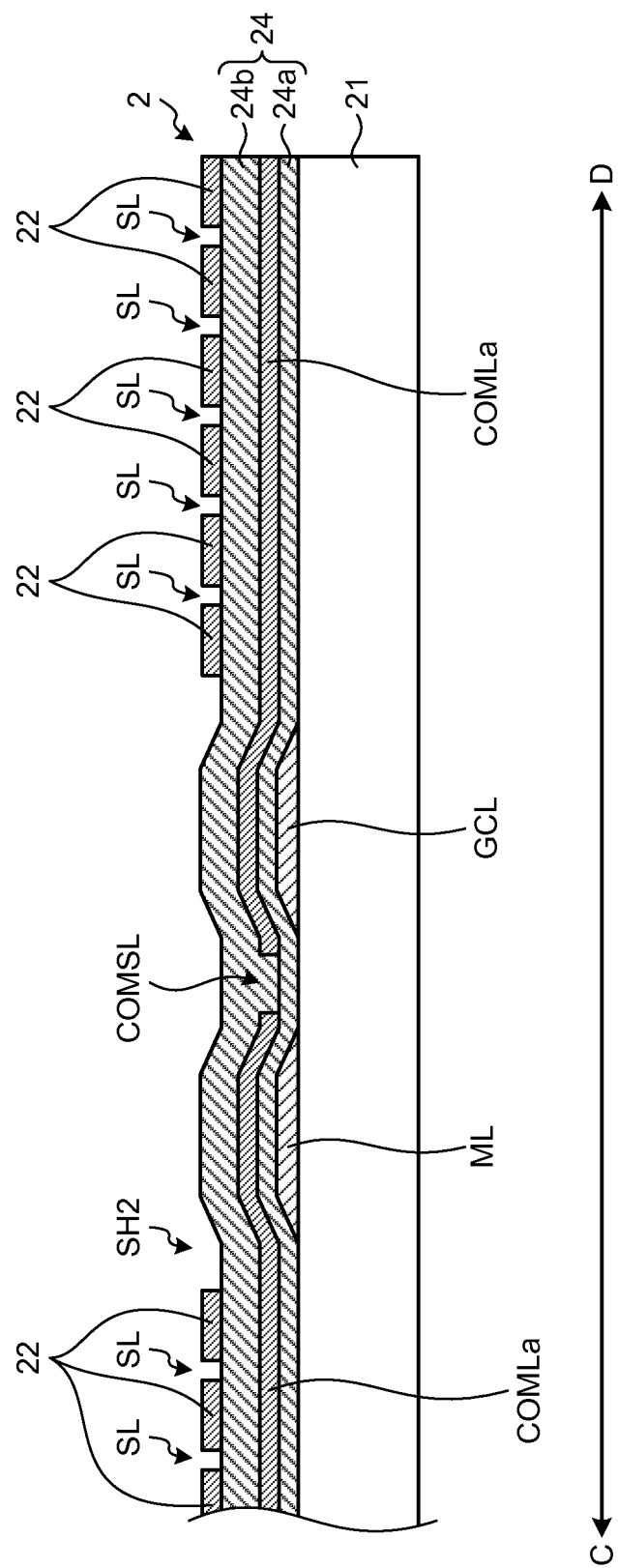
FIG. 20 is a schematic diagram of a cross section schematically illustrating a C-D cross section of the pixel substrate illustrated in FIG. 16.

For this reason, the display device 1 with a touch detection function according to the present embodiment uses the following structure to prevent the burn-in of the liquid crystal layer caused by the auxiliary wirings ML. FIG. 19 is a schematic diagram of a cross section schematically illustrating an A-B cross section of the pixel substrate illustrated in FIG. 16. FIG. 20 is a schematic diagram of a cross section schematically illustrating a C-D cross section of the pixel substrate illustrated in FIG. 16. The translucent substrate 21 functions as a TFT substrate on which various circuits are formed. The pixel electrodes 22 arranged in the matrix and the drive electrode pieces COMLa are formed on the translucent substrate 21. As illustrated in FIG. 19, the pixel electrodes 22 and the drive electrode pieces COMLa are insulated from each other by the insulating layer 24, and face each other in the direction perpendicular to the surface of the translucent substrate 21. The pixel electrodes 22 and the drive electrode pieces COMLa are translucent electrodes formed of a translucent conductive material (translucent conductive oxide) such as ITO.

A semiconductor layer 90 being the switching element Tr of each of the sub-pixels SPix, and wirings such as the data line SGL for supplying a pixel signal to each of the pixel electrodes 22, and the scan line GCL for driving each of the switching elements Tr are layered on the surface of the translucent substrate 21 through the insulating layer 24. The auxiliary wiring ML is a wiring for supplying the potential of the potential supply wiring PL to the drive electrode piece COMLa via a through hole SH2. In the through hole SH2, the drive electrode piece COMLa is electrically coupled to the auxiliary wirings ML at a connecting portion MLa. The through hole SH2 is provided to each pixel. Accordingly, there are a plurality of connecting portion MLa arrayed along the auxiliary wirings ML in plan view. The drive electrode piece COMLa is supplied with a potential of the potential supply wiring PL via the plurality of connecting portion MLa arrayed in the row direction.

The insulating layer 24 has an insulating layer (first insulating film) 24a between the scan line GCL and the semiconductor layer 90 and an insulating layer (second insulating film) 24b between the pixel electrodes 22 and the drive electrode pieces COMLa, which are layered. More specifically, the insulating layer 24a is layered on a location (layer) where each portion is in contact with the translucent substrate 21 or with the scan line GCL. The insulating layer 24b is layered on a location (layer) where each portion is in contact with the data line SGL, the semiconductor layer 90, or with the surface of the insulating layer 24a. The insulating layer 24a and the insulating layer 24b according to the present embodiment are inorganic insulating layer of silicon nitride (SiNx) or silicon oxide. The insulating layer 24b may be formed of an organic insulating material such as a polyimide resin. The material forming the layers of the insulating layer 24a and the insulating layer 24b is not limited thereto. The insulating layers 24a and 24b may be formed of the same insulating material, or either one of them may be formed of a different insulating material.

As illustrated in FIG. 16 and FIG. 19, the scan line GCL three-dimensionally intersects with part of the semiconductor layer 90 to act as a gate GCLa of the switching element Tr. There is one portion at which the scan line GCL and part of the semiconductor layer 90 three-dimensionally intersect with each other, and the switching element Tr is a single gate transistor with an n-channel region ch. The switching element Tr may be a double gate transistor, or any functional element (switching element) as long as it has a switching function. The semiconductor layer 90 is formed of, for example, amorphous silicon. The data line SGL extends on a plane parallel to the surface of the translucent substrate 21, and supplies a pixel signal for displaying an image to pixels. The semiconductor layer 90 is in contact with a source SGLa coupled at part thereof to the data line SGL, and is electrically coupled at the other portion to a drain SGLb formed on the same layer as the data line SGL. The drain SGLb according to the present embodiment electrically coupled to the pixel electrode 22 by a through hole SH1. In the present embodiment, the scan line GCL is a wiring of metal such as molybdenum (Mo) and aluminum (Al), and the data line SGL is a wiring of metal such as aluminum. The auxiliary wiring ML is a wiring of metal such as aluminum. The auxiliary wiring ML, the scan line GCL and the drive electrode piece COMLa, the insulating layer 24a, the data line SGL and the semiconductor layer 90, the insulating layer 24b, and the pixel electrodes 22 are layered on the translucent substrate 21 according to the present embodiment in this order.

Openings SL are formed with respect to the pixel electrodes 22 corresponding to the sub-pixels SPix, and the liquid crystal is driven by an electric field (fringe electric field) leaked from the openings SL in the pixel electrodes 22 of the electric field formed between the drive electrode piece COMLa and the pixel electrodes 22.

The auxiliary wiring ML is a wiring for supplying a potential of the potential supply wiring PL to the drive electrode piece COMLa via the through hole SH2, and electrically couples to the drive electrode piece COMLa via the through hole SH2, which enables the display drive voltage VcomDC to be supplied to the sub-pixels SPix.

As illustrated in FIG. 20, the auxiliary wiring ML is provided along the scan line GCL adjacent thereto in the column direction. The potential of the auxiliary wiring ML becomes a common potential in the display operation period Pd, and a potential difference between the auxiliary wiring and the scan line GCL is produced. However, the scan line GCL adjacent to the slit COMSL overlaps with the drive electrode piece COMLa in the vertical direction of the translucent substrate 21. The scan line GCL is covered with the drive electrode piece COMLa having the same potential as that of the auxiliary wiring ML and shielded, and therefore the influence of the potential difference on the liquid crystal layer can be reduced. The auxiliary wiring ML overlaps with the drive electrode piece COMLa in the vertical direction of the translucent substrate 21. With this structure, the electric field due to the potential difference between the voltage of the drive electrode COML and the voltage of the pixel electrode 22 hardly reaches the liquid crystal layer. Therefore, as illustrated in FIG. 16, a width CP of the drive electrode piece COMLa in the column direction with respect to one pixel Pix according to the present embodiment becomes wider than a maximum distance PP in the column direction between the auxiliary wiring ML and the scan line GCL with respect to the one pixel Pix. With this structure, the potential difference between the auxiliary wiring ML and the scan line GCL hardly affects the orientation of the liquid crystal molecules, thus reducing the possibility of the burn-in or so.

Figure 21:
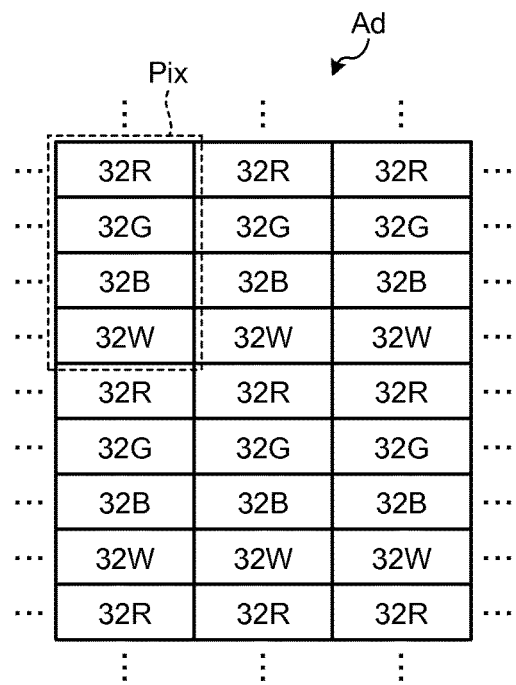
FIG. 21 is an explanatory diagram representing a pixel array according to a modification of the present embodiment.
Figure 22:
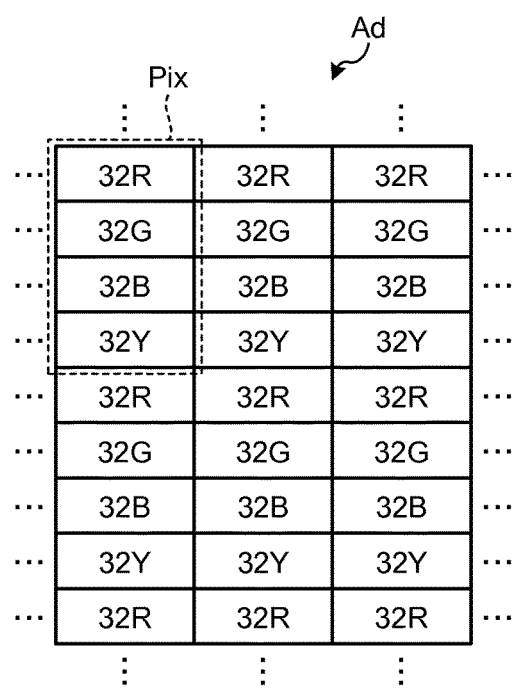
FIG. 22 is an explanatory diagram representing a pixel array according to a modification of the present embodiment.

FIG. 21 and FIG. 22 are explanatory diagrams representing a pixel array according to modifications of the present embodiment. In the above example, the color filter illustrated in FIG. 8 is configured to periodically array the color regions of the color filter respectively colored in the three colors of, for example, red (R), green (G), and blue (B), and to associate the color regions 32R, 32G, and 32B of the three colors of R, G, and B, which are grouped in a set as a pixel Pix, with the sub-pixels SPix illustrated in FIG. 10. The present embodiment is not limited thereto. As illustrated in FIG. 21, color regions of the color filter respectively colored in four colors of, for example, red (R), green (G), blue (B), and white (W) are periodically arrayed in the column direction, and color regions 32R, 32G, 32B, and 32W of the four colors of R, G, B, and W, which are grouped in a set as a pixel Pix, may be associated with the sub-pixels SPix illustrated in FIG. 10. As illustrated in FIG. 22, color regions of the color filter respectively colored in four colors of, for example, red (R), green (G), blue (B), and yellow (Y) are periodically arrayed in the column direction, and color regions 32R, 32G, 32B, and 32Y of the four colors of R, G, B, and Y, which are grouped in a set as a pixel Pix, may be associated with the sub-pixels SPix illustrated in FIG. 10.

As explained above, the display device 1 with a touch detection function according to the present embodiment and the modifications includes the display area Ad, the display function layer exemplified as the liquid crystal layer, the pixel electrode 22, the scan line GCL, the data line SGL, the drive electrode COML (drive electrode piece COMLa), the auxiliary wiring ML, the touch detection electrode TDL, the control device, and the touch detection unit 40.

The display area Ad has a plurality of pixels arranged in a matrix including a plurality of rows and a plurality of columns, and one pixel includes a plurality of sub-pixels for representing mutually different colors. In arbitrary pixels which are adjacent to each other and in each of which the sub-pixels are arrayed in one column with k rows, arbitrary sub-pixels representing the same color are arrayed along the row direction. A plurality of scan lines GCL extend in the row direction of the display area Ad, and scan the switching elements of the sub-pixels. A plurality of data lines SGL extend in the column direction of the display area Ad, and supply an applied voltage to the pixel electrodes. With this structure, the number of data lines SGL can be reduced, and a circuit scale of the source driver 13 can be decreased.

The display function layer has only to have the image display function for displaying an image in the display area, and may be an organic electro-luminescence (OEL) layer instead of the liquid crystal layer.

The pixel electrode 22 is provided in each of the sub-pixels SPix, and provides an applied voltage to the display function layer by a potential difference with the common potential which is a reference. The drive electrode COML is provided facing the pixel electrode 22, and extends in the row direction. The shape that extends in the column direction or in the row direction may be bent depending on the pattern as illustrated in FIG. 16.

The auxiliary wiring ML is a wiring of a metal material having an electrical resistance lower than that of a material of the drive electrode COML. The auxiliary wiring ML is arranged so as to extend in the row direction for each row of a pixel Pix, and is electrically coupled to the drive electrode COML via the through hole SH2.

The display device 1 with a touch detection function according to the present embodiment and the modifications performs image display control so that the control device applies a common potential between the pixel electrode 22 and the drive electrode COML in the display operation period Pd based on the image signal and achieves the image display function of the display function layer. Moreover, the display device 1 with a touch detection function according to the present embodiment and the modifications performs touch detection control so that the control device time-divisionally and sequentially supplies the touch drive signal VcomAC to the drive electrodes COML in the touch detection operation period Pt for each drive electrode block DB. The touch detection electrode TDL faces the drive electrode COML to form a capacitance with the drive electrode COML. The touch detection unit 40 detects a position of a proximity object based on the detection signal from the touch detection electrode TDL in the touch detection operation period Pt.

Thereby, the influence of the auxiliary wiring ML on the aperture ratio is suppressed. The auxiliary wiring ML applies the touch drive signal VcomAC to the drive electrode piece COMLa, which enables the operation in the touch detection operation period Pt to be performed while the influence of the time constant on the touch drive signal VcomAC is suppressed. Consequently, the waveform of the touch drive signal VcomAC is transmitted satisfactorily, thus improving the detection accuracy (touch detection accuracy) of the proximity object.

Although the semiconductor of the switching element Tr according to the present embodiment is formed of amorphous silicon, the material of the auxiliary wiring ML has a lower resistance than that of the drive electrode COML, and therefore the time required for transmitting the touch drive signal VcomAC for each drive electrode block DB can be ensured in the touch detection operation period Pt.

The drive electrode COML according to the present embodiment has the slit COMSL that extends in the row direction of the display area and is provided in a boundary area of pixels Pix adjacent to each other in the column direction of the display area Ad. The slits COMSL arranged at a given pitch are hard to be recognized, and this enables the potential of the potential supply wiring PL supplied for each auxiliary wiring ML to be stabilized in the row direction.

The scan line GCL adjacent to the slit COMSL overlaps with the drive electrode COML in the vertical direction of the pixel substrate 2. With this structure, the scan line GCL is shielded by a conductor having the same potential as that of the auxiliary wiring ML.

The auxiliary wiring ML overlaps with the drive electrode COML in the vertical direction of the pixel substrate 2. Therefore, the electric field in association with the potential difference between the scan line GCL adjacent to the slit COMSL and the auxiliary wiring ML is prevented from being leaked to the liquid crystal layer.

The auxiliary wirings ML are electrically coupled to the drive electrodes COML via the through holes SH2 respectively arranged in the pixels Pix that are arrayed in the row direction of the display area Ad. With this structure, the fluctuation of the common potential in the display area Ad can be suppressed in the display operation period Pd. Accordingly, the display device 1 with a touch detection function according to the present embodiment and the modifications can keep display quality even in a central portion of the display area Ad in the display operation period Pd.

Application Examples

Figure 23:
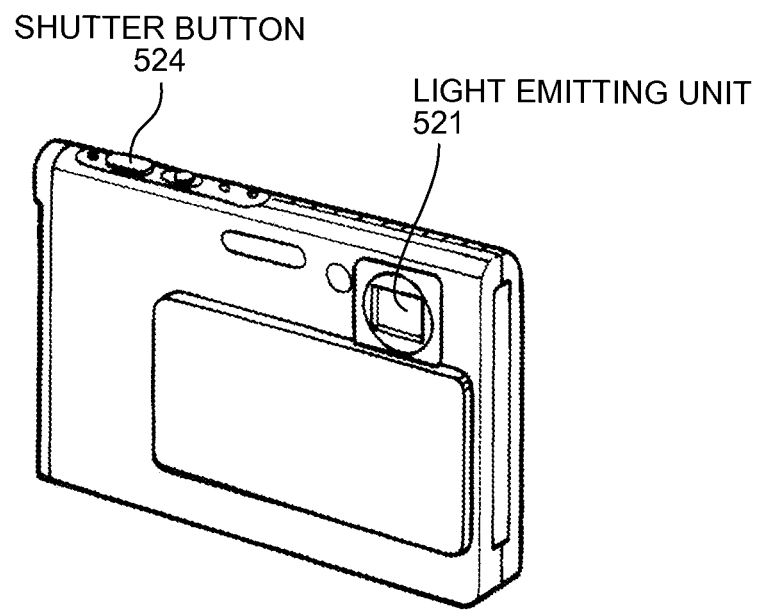
FIG. 23 is a diagram of an example of an electronic apparatus to which the display device with a touch detection function according to the present embodiment is applied.
Figure 24:
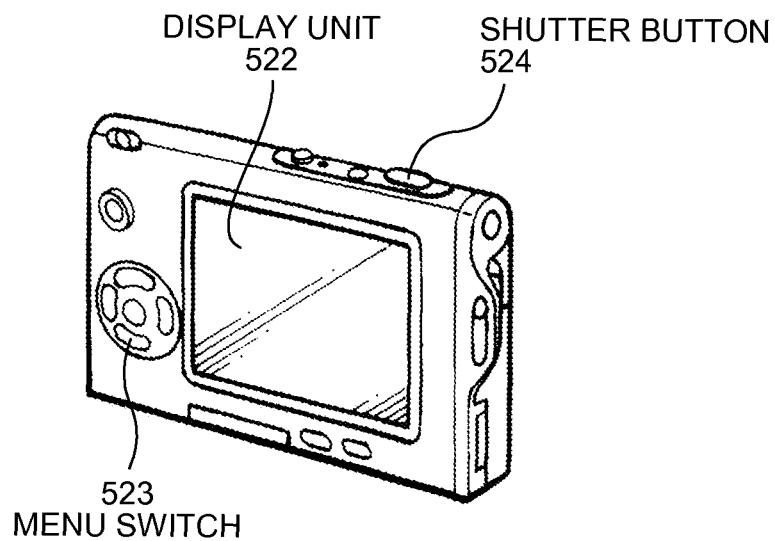
FIG. 24 is a diagram of an example of the electronic apparatus to which the display device with a touch detection function according to the present embodiment is applied.

Application examples of the display device 1 with a touch detection function as explained in the present embodiment will be explained next with reference to FIG. 23, FIG. 24, and FIG. 25. FIG. 23, FIG. 24, and FIG. 25 are diagrams of examples of an electronic apparatus to which the display device with a touch detection function according to the present embodiment is applied. The display device 1 with a touch detection function according to the present embodiment can be applied to electronic apparatuses in all fields such as television devices, a digital camera illustrated in FIG. 23 and FIG. 24, notebook personal computers, portable electronic apparatuses such as a mobile telephone, car-mounted electronic apparatuses such as a car navigation system illustrated in FIG. 25, or video cameras. In other words, the display device 1 with a touch detection function according to the present embodiment can be applied to electronic apparatuses in all fields that display an externally input video signal or an internally generated video signal as an image or a video. The electronic apparatus includes a control device that supplies a video signal to a liquid-crystal display device and controls the operation of the liquid-crystal display device.

The electronic apparatus illustrated in FIG. 23 and FIG. 24 is a digital camera to which the display device 1 with a touch detection function according to the present embodiment is applied. The digital camera includes, for example, a light emitting unit 521 for a flash, a display unit 522, a menu switch 523, and a shutter button 524. The display unit 522 is the display device with a touch detection function according to the present embodiment.

The electronic apparatus illustrated in FIG. 25 is a car navigation device to which the display device 1 with a touch detection function according to the present embodiment is applied. The display device 1 with a touch detection function is installed in a dashboard 300 inside a vehicle. Specifically, it is installed between a driver's seat 311 and a passenger's seat 312 in the dashboard 300. The display device 1 with a touch detection function of the car navigation device is used for display of navigation, display of a music operation screen, or display of movie reproduction, and the like.

The embodiment is not limited by the contents described above. In addition, the components of the embodiment include those which can be easily thought of by persons skilled in the art, those which are substantially equivalent to each other, and those in a scope of so-called equivalents. Moreover, the components can be omitted, replaced, and modified in various ways within a scape that does not depart from the gist of the embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display device with a touch detection function comprising:
a display area that has a plurality of pixels arranged in a matrix including a plurality of rows and a plurality of columns, in which one of the pixels includes a plurality of sub-pixels that represent mutually different colors and are arrayed in one column with k rows (k is a natural number of 3 or more), and in which arbitrary sub-pixels representing same color among arbitrary pixels that are adjacent to each other in a row direction are arrayed along the row direction;
a display function layer that has an image display function for displaying an image in the display area;
a pixel electrode that is provided in each of the sub-pixels and supplies an applied voltage to the display function layer by a potential difference with a common potential which is a reference;
a plurality of scan lines that extend in the row direction of the display area and scan switching elements of the sub-pixels;
a plurality of data lines that extend in a column direction of the display area and supply an applied voltage to the pixel electrodes;
a plurality of drive electrodes that are provided facing the pixel electrodes and extend in the row direction;
a slit that extends between the drive electrodes in the row direction of the display area, and the slit is provided in a boundary area of the pixels adjacent to each other in the column direction of the display area;
an auxiliary wiring that is a wiring of a metal material having an electrical resistance lower than that of a material of the drive electrodes, the auxiliary wiring being arranged along the slit so as to extend in the row direction for each row of the sub-pixels representing the same color and being electrically coupled to a drive electrode, and the auxiliary wiring overlaps with the drive electrode in a vertical direction of a pixel substrate;
a control device that performs image display control so as to apply the common potential to the drive electrodes based on an image signal to achieve the image display function of the display function layer, and that performs touch detection control so as to supply a drive signal for touch to the drive electrodes;
a touch detection electrode that faces the drive electrodes and forms a capacitance with the drive electrodes; and
a touch detection unit that detects a position of a proximity object based on a detection signal sent from the touch detection electrode.

2. The display device with a touch detection function according to claim 1, wherein a semiconductor of the switching element is formed of amorphous silicon.

3. The display device with a touch detection function according to claim 1, wherein at least one of the scan lines adjacent to the slit in the column direction overlaps with the drive electrode in the vertical direction of the pixel substrate.

4. The display device with a touch detection function according to claim 3, wherein a width of respective drive electrode in the column direction of the display area with respect to one of the pixels is wider than a maximum distance between the auxiliary wiring and a scan line with respect to the one of the pixels in the column direction of the display area, and wherein the scan line overlaps with the respective drive electrode.

5. The display device with a touch detection function according to claim 1, wherein the auxiliary wiring is electrically coupled to the drive electrode via a through hole arranged in each of the pixels which are arrayed in the row direction of the display area.

6. An electronic apparatus that includes the display device with a touch detection function according to claim 1.

* * * * *